(12) United States Patent
Niwa

(10) Patent No.: US 12,301,081 B2
(45) Date of Patent: May 13, 2025

(54) ELECTRIC WORK MACHINE

(71) Applicant: MAKITA CORPORATION, Anjo (JP)

(72) Inventor: Akira Niwa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 548 days.

(21) Appl. No.: 17/417,927

(22) PCT Filed: Dec. 20, 2019

(86) PCT No.: PCT/JP2019/050189
§ 371 (c)(1),
(2) Date: Jun. 24, 2021

(87) PCT Pub. No.: WO2020/137916
PCT Pub. Date: Jul. 2, 2020

(65) Prior Publication Data
US 2022/0094251 A1    Mar. 24, 2022

(30) Foreign Application Priority Data

Dec. 26, 2018 (JP) ................................. 2018-242998

(51) Int. Cl.
*H02K 3/30* (2006.01)
*H02K 1/276* (2022.01)
(Continued)

(52) U.S. Cl.
CPC ............ *H02K 29/08* (2013.01); *H02K 1/276* (2013.01); *H02K 7/145* (2013.01); *H02K 11/215* (2016.01); *H02K 11/33* (2016.01)

(58) Field of Classification Search
CPC ...... H02K 29/08; H02K 11/215; H02K 11/33; H02K 1/276; H02K 7/145; H02K 2203/12
See application file for complete search history.

(56) References Cited

U.S. PATENT DOCUMENTS 4,130,769 A * 12/1978 Karube .................... H02K 3/04
310/46
4,952,830 A * 8/1990 Shirakawa ............. H02K 29/08
310/68 B
(Continued)

FOREIGN PATENT DOCUMENTS

CN        1496602 A      5/2004
CN      103516164 A      1/2014
(Continued)

OTHER PUBLICATIONS

Jun. 7, 2022 Office Action issued in Japanese Patent Application No. 2020-563220.
(Continued)

*Primary Examiner* — Burton S Mullins
(74) *Attorney, Agent, or Firm* — Oliff PLC

(57) ABSTRACT

An electric work machine includes a motor, a driver, and a rotation sensor. The motor includes a stator, and a rotor of permanent-magnet type. The stator includes a cylindrical body, teeth, and coils. The rotation sensor is installed in an area of the stator close to the rotor than an area where the coils are disposed in a radial direction of the stator.

16 Claims, 15 Drawing Sheets

(51) Int. Cl.
*H02K 7/14* (2006.01)
*H02K 11/215* (2016.01)
*H02K 11/33* (2016.01)
*H02K 29/08* (2006.01)

(56) References Cited

U.S. PATENT DOCUMENTS

| | | | |
|---|---|---|---|
| 5,895,994 A * | 4/1999 | Molnar | H02K 1/165 |
| | | | 310/410 |
| 9,948,162 B2 * | 4/2018 | Nagahama | H02K 11/215 |
| 2004/0119366 A1 | 6/2004 | Hosaka | |
| 2014/0001892 A1 | 1/2014 | Bekavac et al. | |
| 2016/0094110 A1 * | 3/2016 | Drye | H02K 5/15 |
| | | | 29/598 |
| 2016/0141939 A1 * | 5/2016 | Aoyama | H02K 21/22 |
| | | | 310/68 B |
| 2016/0336838 A1 | 11/2016 | Kouda et al. | |
| 2018/0219436 A1 | 8/2018 | Shiozawa et al. | |
| 2018/0241281 A1 | 8/2018 | Doan et al. | |
| 2019/0036423 A1 | 1/2019 | Oketani et al. | |
| 2019/0097497 A1 | 3/2019 | Fukunaga | |
| 2019/0157929 A1 * | 5/2019 | Cho | H02K 7/14 |
| 2020/0186000 A1 * | 6/2020 | Kokubo | H02K 11/215 |

FOREIGN PATENT DOCUMENTS

| | | |
|---|---|---|
| CN | 106160390 A | 11/2016 |
| CN | 108377049 A | 8/2018 |
| CN | 108462350 A | 8/2018 |
| CN | 108702078 A | 10/2018 |
| JP | S62-168784 U | 10/1987 |
| JP | 2013-110846 A | 6/2013 |
| JP | 2018-047530 A | 3/2018 |
| JP | 2018-137843 A | 8/2018 |
| WO | 2017/175387 A1 | 10/2017 |
| WO | 2017/221702 A1 | 12/2017 |

OTHER PUBLICATIONS

Feb. 4, 2020 International Search Report issued in International Patent Application No. PCT/JP2019/050189.
Jun. 16, 2021 International Preliminary Report on Patentability issued in International Patent Application No. PCT/JP2019/050189.
Apr. 15, 2023 Office Action Issued in Chinese Patent Application No. 201980085707.8.

* cited by examiner

ELECTRIC WORK MACHINE

CROSS-REFERENCE TO RELATED APPLICATION

This international application claims the benefit of Japanese Patent Application No. 2018-242998, filed on Dec. 26, 2018 in the Japan Patent Office, and the entire disclosure of Japanese Patent Application No. 2018-242998 is incorporated herein by reference.

TECHNICAL FIELD

The present disclosure relates to a technique to install a rotation sensor for detecting a rotational position of a motor in an electric work machine having the motor.

BACKGROUND ART

Patent Document 1 cited below discloses an electric power tool that includes a motor. This electric power tool includes a sensor board attached to an end part of the motor. A Hall sensor for detecting a rotational position of the motor is installed on the sensor board.

PRIOR ART DOCUMENTS

Patent Documents

Patent Document 1: Japanese Unexamined Patent Application Publication No. 2018-047530

SUMMARY OF THE INVENTION

Problems to be Solved by the Invention

An electric power tool disclosed in Patent Document 1 includes a Hall sensor on a sensor board, which is separate from a motor. Such an electric power tool may require an elongation of the rotor to dispose the Hall sensor near the rotor. Elongation of the rotor leads to an increase in size of the rotor. Furthermore, in such an electric power tool, a tolerance of distance between the Hall sensor and the rotor includes a tolerance of thickness of the sensor board. This inclusion of the tolerance of thickness of the sensor board in the tolerance of distance between the Hall sensor and the rotor may lead to a decrease in a detection accuracy of rotational positions.

Preferably, one aspect of the present disclosure is to provide an electric work machine that can inhibit an increase in size of a motor while accurately detecting the rotational position of the motor with a rotation sensor.

Means for Solving the Problems

An electric work machine in one aspect of the present disclosure includes a motor, a driver, and a rotation sensor. The driver is configured for an attachment of a driven member. The driver receives a rotational force of the motor. The driver drives the driven member attached to the driver with the rotational force of the motor. The driven member operates on a target of operation in response to being driven by the driver. The rotation sensor outputs a signal in accordance with a rotational position of the motor.

The motor includes a stator, and a rotor of permanent-magnet type. The stator includes a cylindrical body (annular member), teeth, and coils. The cylindrical body includes a first inner circumferential surface, and a first outer circumferential surface. The teeth are disposed to stand on the first inner circumferential surface or the first outer circumferential surface. The coils generate a magnetic force in response to receiving an electric power. Each of the coils is wound around an allocated tooth of the teeth.

The rotation sensor is installed in the stator. The rotation sensor is installed in an area of the stator; the area is closer to the rotor than an area where the coils are disposed in a radial direction of the stator.

In the electric work machine configured as above, the rotation sensor is installed in the stator that is included in the motor. In addition, the rotation sensor is installed in the area of the stator closer to the rotor than the area where the coils are disposed. This makes it possible to dispose the rotation sensor near the rotor without increasing the size of the rotor. Accordingly, the rotational position of the motor can be accurately detected with the rotation sensor.

The driven member may be configured to be attachable to and detachable from the driver. The target of operation may be any substance. The target of operation may be, for example, various workpieces, various fasteners, plants, dusts, gasses, liquids, and any other substances. The various workpieces may include, for example, woods, metals, and plastics. The various fasteners may include, for example, screws, nails, and nuts. The driven member may operate on the target of operation in any ways. The driven member may operate on a workpiece for example. Specifically, the driven member may operate, for example, to make a hole on the workpiece or to cut or polish the workpiece. The driven member may operate on a fastener for example. Specifically, the driven member may be configured, for example, to operate to rotate the screw thereby to fasten the screw into a fastening target material. The driven member may affect the air surrounding the electric work machine for example. Specifically, the driven member may operate, for example, to provide force to the air surrounding the electric work machine so as to generate airflow. Such airflow may be generated to help discharge the air from the electric work machine for example. Such airflow may be generated to let the air into the electric work machine. The driven member may be configured, for example, to affect a liquid for release or suction of the liquid. The driven member may also affect a plant for example. Specifically, the driven member may be configured, for example, to cut plants such as grasses and small-diameter woods.

The stator may include a stator core, and an insulator. The stator core corresponds to a first portion of the cylindrical body and also corresponds to a first portion of each tooth of the teeth. The stator core may contain a magnetic substance. The insulator corresponds to a second portion of the cylindrical body and also corresponds to a second portion of each tooth of the teeth. The insulator may be arranged adjacent to the stator core in a direction along a rotational axis of the rotor. The insulator may include resin. The rotation sensor may be installed in the insulator.

In the electric work machine configured as above, the rotation sensor is installed in the insulator of the motor. Accordingly, the installment of the rotation sensor in the motor can be simplified.

The insulator may contain nothing but resin. The insulator may contain resin and an insulating material other than resin. The insulator may contain nothing but an insulating material other than resin. The insulator may be formed by any method. The insulator may be integrally formed by a molding method such as an injection molding method, for example.

The stator core may include a core tubular body, and core teeth. The core tubular body corresponds to the first portion of the cylindrical body. Each core tooth of the core teeth corresponds to the first portion of each tooth of the teeth. The insulator includes an insulator tubular body, and insulator teeth. The insulator tubular body corresponds to the second portion of the cylindrical body. Each insulator tooth of the insulator teeth corresponds to the second portion of each tooth of the teeth. The rotation sensor may be installed in/on one of the insulator teeth.

In the electric work machine configured as above, the rotation sensor is installed in one insulator tooth of the insulator teeth. This enables the rotation sensor to be easily disposed closer to the rotor than the coils are.

The insulator tubular body may include a second inner circumferential surface and a second outer circumferential surface. The second inner circumferential surface corresponds to a part of the first inner circumferential surface. The second outer circumferential surface corresponds to a part of the first outer circumferential surface. Each insulator tooth of the insulator teeth may include a tooth main body, and an end portion forming a flange. The tooth main body is disposed to stand on the second inner circumferential surface or the second outer circumferential surface. One allocated coil of the coils is wound around the tooth main body. The tooth main body includes an end part protruding towards the rotational axis of the rotor. The tooth main body is formed into a tubular shape. The end portion is disposed in the end part of the tooth main body. The rotation sensor may be installed in the end portion.

The electric work machine configured as above enables the rotation sensor to be infallibly disposed closer to the rotor than the coils are.

The insulator teeth may include a first insulator tooth having the rotation sensor installed therein. The first insulator tooth is one insulator tooth of the insulator teeth. The first insulator tooth may include a pedestal having a plate shape and disposed in the end portion. The rotation sensor may be installed in/on the pedestal.

In the electric work machine configured as above, the rotation sensor is installed in the pedestal. This enables the rotation sensor to be stably disposed closer to the rotor than the coils are.

The pedestal may include a plate surface. The plate surface may be disposed outside of the rotor in a direction along the rotational axis of the rotor. The plate surface may face an end surface of the rotor.

In the electric work machine configured as above, the pedestal is disposed outside of the rotor in the direction along the rotational axis of the rotor. This enables the rotation sensor to be easily installed in the pedestal. This also enables the rotation sensor to be disposed to face the end surface of the rotor. Accordingly, the rotation sensor can detect changes in a magnetic field caused by the rotation of the rotor with an increased properness.

A surface parallel with the plate surface of the pedestal may cross the rotational axis of the rotor. The plate surface may be perpendicular to the rotational axis of the rotor. The electric work machine configured as above can properly detect the rotational position of the rotor while inhibiting an increase in size of the motor caused by disposing the pedestal and the rotation sensor.

Each insulator tooth of the insulator teeth may include a pedestal. In this case, the electric work machine may further include one or more additional rotation sensors. Each of the rotation sensor and one or more additional rotation sensors may be installed in the pedestal of an allocated insulator tooth of the insulator teeth.

The electric work machine configured as above enables each of the rotation sensor and one or more additional rotation sensors to be efficiently and properly installed in the motor.

The motor may be an inner-rotor type motor.

EXPLANATION OF REFERENCE NUMERALS

1 . . . electric work machine; 8 . . . chuck sleeve; 12 . . . motor; 13 . . . driving mechanism; 15 . . . controller; 20 . . . stator; 21 . . . stator back-ring; 22 . . . stator tooth; 23 . . . stator tooth main body; 24 . . . stator tooth end portion; 31 . . . first coil; 32 . . . second coil; 33 . . . third coil; 34 . . . fourth coil; 35 . . . fifth coil; 36 . . . sixth coil; 41 . . . stator core; 42, 120 . . . first insulator; 51 . . . back core; 52 . . . core tooth; 53 . . . core tooth main body; 54 . . . core tooth end portion; 61 . . . first back-ring; 62, 122 . . . first tooth; 63, 123 . . . first tooth main body; 64, 124 . . . first tooth end portion; 65 . . . pedestal; 71, 72, 73 . . . rotation sensor; 90 . . . rotor; 96-99 . . . magnet.

MODE FOR CARRYING OUT THE INVENTION

Hereinafter, example embodiments of the present disclosure will be explained with reference to the drawings.

First Embodiment (1-1) Configuration of Electric Work Machine

Figure 1:
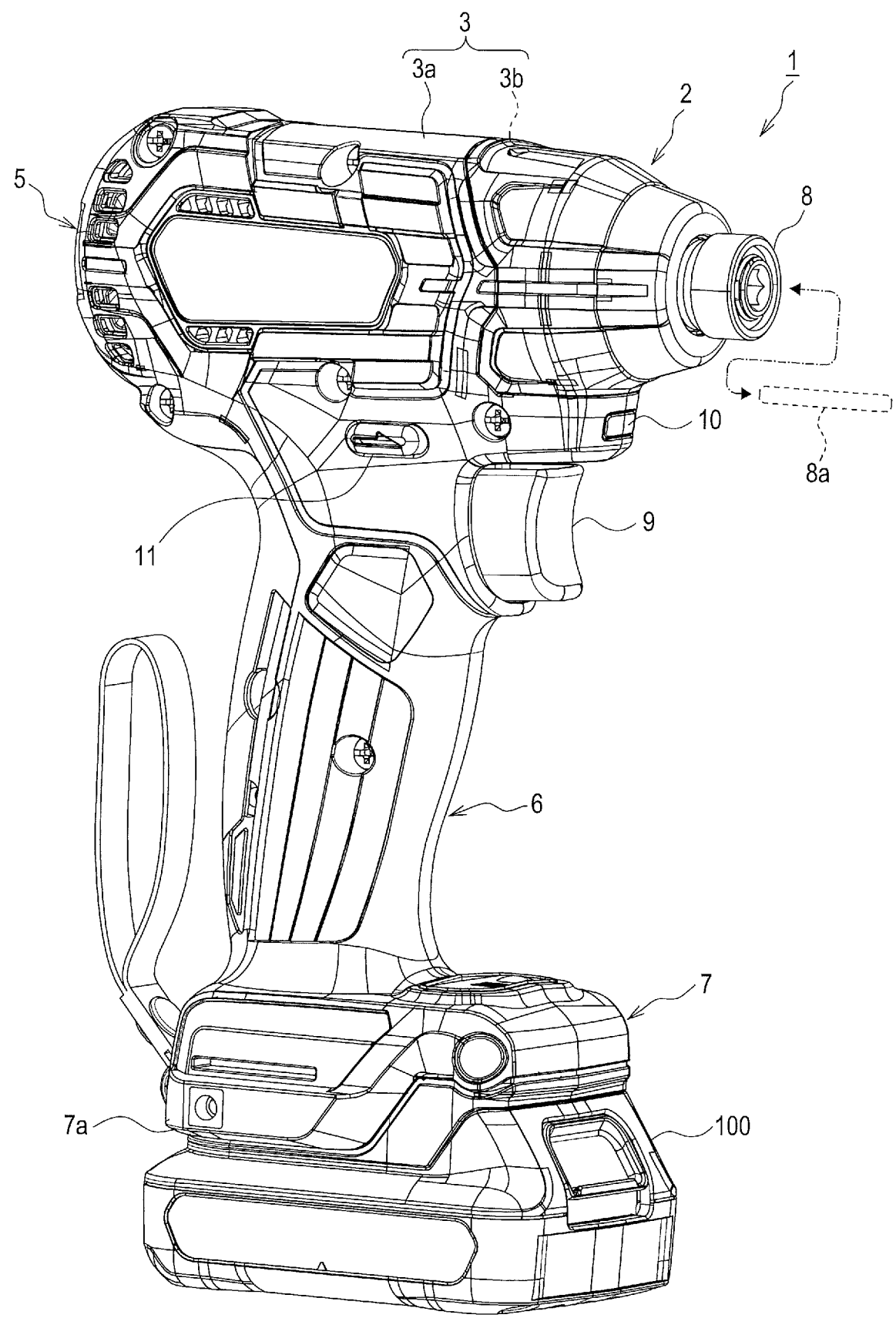
FIG. 1 is a perspective view of an electric work machine in an embodiment.

An electric work machine 1 shown in FIG. 1 is configured as, for example, a rechargeable impact driver. The rechargeable impact driver is operated by electric power supplied from a battery pack 100, which will be mentioned later. The rechargeable impact driver is used, for example, to rotate a fastening member, such as a screw and a bolt, into a target of operation. When rotating the fastening member, the rechargeable impact driver generates hammering in a rotational direction in accordance with a load applied by the fastening member. The rechargeable impact driver can generate a large torque in the rotational direction by the hammering.

As shown in FIG. 1, the electric work machine 1 in the present embodiment includes a main body 2, and the battery pack 100. The battery pack 100 is detachably attached to the main body 2.

The main body 2 includes a housing 3. The housing 3 includes two half housings 3a and 3b, which divide the housing 3 in a right half and a left half. The housing 3 is formed by combining these half housings 3a and 3b. The housing 3 may be, for example, an injection molded member containing resin.

The main body 2 includes a first casing 5, a grip 6, and a second casing 7. The first casing 5 includes a chuck sleeve 8, an LED 10, and a rotational direction switch 11. The LED 10 emits light outward from the electric work machine 1. The grip 6 extends from the first casing 5. The second casing 7 extends from the grip 6. The second casing 7 includes a battery port 7a. The battery pack 100 is detachably attached to the battery port 7a. The battery pack 100 includes a battery 101 (see FIG. 3), which will be mentioned later.

The grip 6 is held by a user of the electric work machine 1. The grip 6 includes a trigger operating portion 9. The user can pull the trigger operating portion 9 while holding the grip 6.

Figure 2:
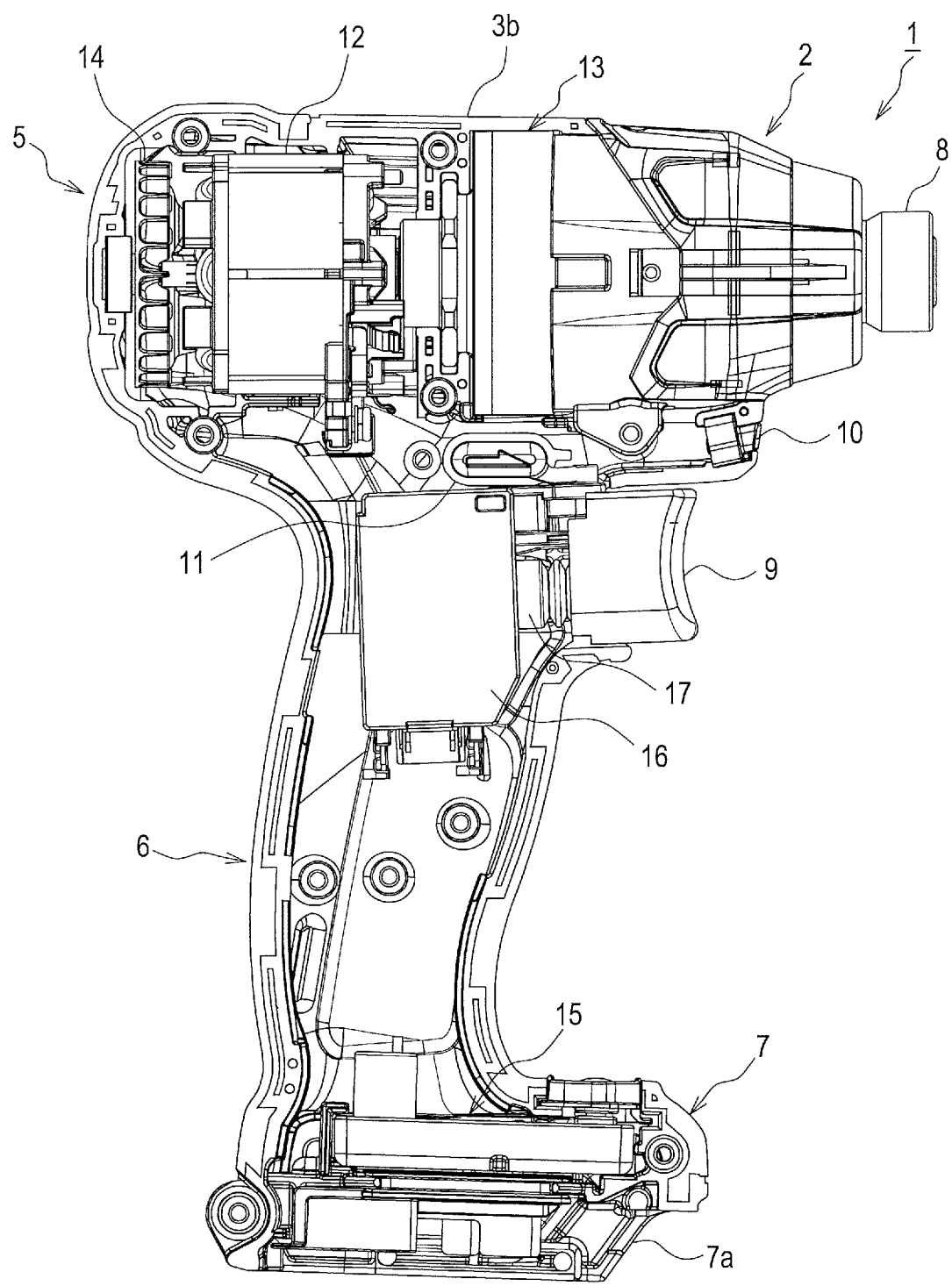
FIG. 2 is a side-surface view showing an internal configuration of the electric work machine in the embodiment.

A configuration inside the main body 2 (that is, inside of the housing 3) will be explained with reference to FIG. 2. FIG. 2 shows the electric work machine 1 with the half housing 3a removed.

As shown in FIG. 2, the first casing 5 includes a motor 12, a driving mechanism 13, a fan 14, the chuck sleeve 8, and the LED 10. Various driven members 8a (members to output operation) are detachably attached to the chuck sleeve 8. These driven members 8a include, for example, a driver bit and a socket bit.

In the present embodiment, the motor 12 is a brushless motor for example. A rotational driving force (rotational force) generated by the motor 12, which is a rotational driving force generated by a rotor 90 (see FIG. 4 etc.) and will be mentioned later, is transmitted to the driving mechanism 13. The driving mechanism 13 includes, for example, unillustrated deceleration mechanism and hammering mechanism. The deceleration mechanism decelerates a rotational speed generated by the rotational driving force transmitted from the motor 12.

The hammering mechanism may include unillustrated spindle, hammer, and anvil. The spindle rotates by the rotational driving force transmitted from the motor 12 via the deceleration mechanism. The hammer rotates with the spindle in response to the rotation of the spindle. The hammer can also move in a direction parallel with a rotational axis of the chuck sleeve 8. The chuck sleeve 8 is attached to the anvil.

In the hammering mechanism, the rotation of the spindle in response to the rotation of the motor 12 causes the anvil to rotate via the hammer. The chuck sleeve 8 (and thus the driven member 8a) rotates in response to the rotation of the anvil. As the operation with the driven member 8a (e.g., screwing to the target of operation) proceeds and an amount of load applied to the anvil exceeds a specific level, hammering is applied to the anvil by the hammer. This hammering is applied in the rotational direction of the chuck sleeve 8 and increases the rotational torque of the chuck sleeve 8.

The rotational driving force of the motor 12 is further transmitted to the fan 14. As the motor 12 rotates, the rotational driving force of the motor 12 causes the fan 14 to rotate. The fan 14 is disposed to cool each element arranged inside of the main body 2 including the motor 12. The rotation of the fan 14 creates air flow in the main body 2, which cools the inside of the main body 2.

The second casing 7 includes a controller 15. The controller 15 executes various functions of the electric work machine 1. The controller 15 is supplied with an electric power in the battery 101 through the battery pack 100 attached to the main body 2. The controller 15 operates with the electric power supplied from the battery 101 (hereinafter, referred to as "battery power").

The grip 6 includes the trigger operating portion 9 mentioned above, a switch box 16, and a plunder 17. The switch box 16 internally includes a trigger switch 117 (see FIG. 3), which will be mentioned later.

The trigger operating portion 9 is coupled with the switch box 16 via the plunder 17. As the user pulls the trigger operating portion 9, the plunder 17 moves in a pull direction along with the trigger operating portion 9. In the present embodiment, this pulling operation means a manipulation to move the trigger operating portion 9 to the left of FIG. 2.

The trigger operating portion 9 is biased in a direction opposite to the pull direction by an unillustrated elastic member. Thus, when not being pulled, the trigger operating portion 9 is positioned at an initial position as shown in FIG. 2. The trigger operating portion 9 moves in the pull direction from the initial position when being pulled.

The trigger switch 117 is turned ON or turned OFF in accordance with the position of the plunder 17. For example, when the trigger operating portion 9 is not pulled, the trigger switch 117 is in an OFF state; and when the trigger operating portion 9 is pulled for a specified amount or more, the trigger switch 117 is turned ON.

(1-2) Electrical Configuration of Electric Work Machine

Figure 3:
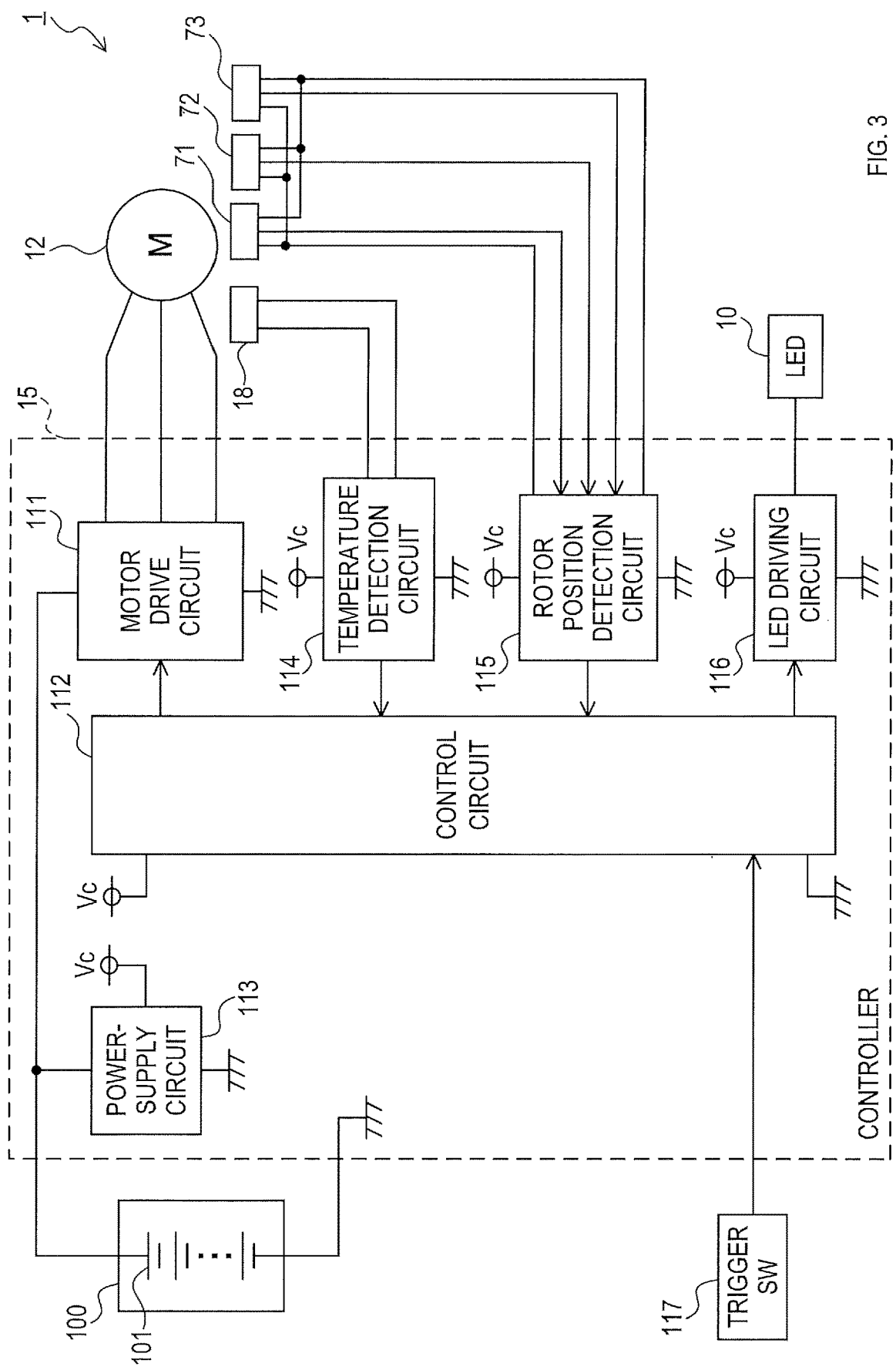
FIG. 3 is a block diagram showing an electrical configuration of the electric work machine in the embodiment.

A supplementary explanation of an electrical configuration of the electric work machine 1 will be given below with reference to FIG. 3. FIG. 3 shows the electrical configuration of the electric work machine 1 with the battery pack 100 attached to the main body 2. As shown in FIG. 3, the electric work machine 1 includes the motor 12, the controller 15, the LED 10, a temperature sensor 18, three rotation sensors 71, 72, 73, the trigger switch 117, and the battery pack 100. The motor 12, the LED 10, the temperature sensor 18, the three rotation sensors 71, 72, 73, and the trigger switch 117 are coupled to the controller 15.

The battery pack 100 includes the battery 101. The battery 101 is, for example, a rechargeable battery. The battery 101 may be a lithium-ion battery, for example. The battery 101 may also be a rechargeable battery different from a lithium-ion battery, for example.

The temperature sensor 18 is installed in the motor 12. The temperature sensor 18 detects a temperature of the motor 12.

Electrical properties of the temperature sensor 18 vary according to the temperature. The temperature sensor 18 is configured to output a temperature-detection signal in accordance with the variations in its electrical properties. In the present embodiment, the temperature sensor 18 is, for example, a thermistor. The temperature sensor 18 may be a negative temperature coefficient (NTC) thermistor, for example.

The rotation sensors 71, 72, 73 are disposed in the motor 12 to detect a rotational position of the rotor 90. More specifically, the rotation sensors 71, 72, 73 are arranged about the rotational axis of the rotor 90 in the rotational direction of the rotor 90; each sensor is separate from one another by an angle corresponding to an electrical angle of 120 degrees.

Each of the rotation sensors 71, 72, 73 outputs a rotation detection signal corresponding to the rotational position of the rotor 90. The controller 15 receives the rotation detection signal input. The rotor 90 is a permanent magnet rotor. Each of the rotation sensors 71, 72, 73 detects changes in the magnetic field corresponding to the rotational position of the rotor 90. Each of the rotation sensors 71, 72, 73 outputs a rotation detection signal in accordance with the detected changes in the magnetic field.

Each of the rotation sensors 71, 72, 73 is a Hall sensor that includes, for example, a Hall element in the present embodiment. Each of the rotation sensors 71, 72, 73 is supplied with an electric current from the controller 15. In each of the rotation sensors 71, 72, 73, the supplied electric current flows to the Hall element. The Hall element includes a detection surface. The Hall element generates an electromotive force in accordance with the size of the magnetic field on the detection surface in a direction perpendicular to the detection surface. Each of the rotation sensors 71, 72, 73 outputs a rotation detection signal in accordance with the electromotive force of the Hall element.

Each of the rotation sensors 71, 72, 73 may output any rotation detection signal in accordance with the electromotive force of the Hall element. For example, each of the rotation sensors 71, 72, 73 may output the electromotive force of the Hall element as an analog rotation detection signal without any changes. For example, each of the rotation sensors 71, 72, 73 may convert the level of the electromotive force of the Hall element by amplifying the electromotive force of the Hall element or the like and output the electromotive force with the converted level as an analog rotation detection signal. For example, each of the rotation sensors 71, 72, 73 may generate a binary digital signal in accordance with the electromotive force of the Hall element and output the digital signal as a rotation detection signal.

The controller 15 includes a motor drive circuit 111, a control circuit 112, a power-supply circuit 113, a temperature detection circuit 114, a rotor position detection circuit 115, and an LED driving circuit 116.

The motor drive circuit 111 converts the battery power to U-phase drive current, V-phase drive current, and W-phase drive current in accordance with a motor drive command. The motor drive command is delivered from the control circuit 112. The motor drive circuit 111 outputs the U-phase drive current, the V-phase drive current, and the W-phase drive current to the motor 12. The motor 12 is driven by the U-phase drive current, the V-phase drive current, and the W-phase drive current.

The power-supply circuit 113 generates a power-supply power from the battery power and outputs the power-supply power. The power-supply power has a constant power-supply voltage Vc. Each element in the controller 15 is operated with the power-supply power. The control circuit 112, the temperature detection circuit 114, the rotor position detection circuit 115, and the LED driving circuit 116 are operated with the power-supply voltage.

The temperature detection circuit 114 detects the temperature of the motor 12 based on the temperature-detection signal received from the temperature sensor 18. The temperature detection circuit 114 outputs a signal that indicates the detected temperature to the control circuit 112.

In the present embodiment, the temperature detection circuit 114 may include a resistor coupled in series with the temperature sensor 18, for example. The temperature detection circuit 114 may be configured to apply the power-supply voltage Vc to a series circuit that includes the temperature sensor 18 and the resistor. The temperature-detection signal may be a voltage at a point of connection of the temperature sensor 18 with the resistor.

The rotor position detection circuit 115 supplies an electric current to the rotation sensors 71, 72, 73 thereby to operate the rotation sensors 71, 72, 73. The rotor position detection circuit 115 receives the rotation detection signal from each of the rotation sensors 71, 72, 73. The rotor position detection circuit 115 detects the rotational position of the rotor 90 based on the rotation detection signal received from the rotation sensors 71, 72, 73. The rotor position detection circuit 115 outputs a signal indicating the detected rotational position to the control circuit 112.

The LED driving circuit 116 supplies the power-supply power to the LED 10 in accordance with an LED drive command received from the control circuit 112 thereby to turn on the LED 10.

The control circuit 112 may include, for example, an unillustrated CPU and memory. Various functions of the electric work machine 1 may each be achieved by the CPU executing various programs stored in the memory.

The control circuit 112 receives a trigger signal from the trigger switch 117. The trigger signal indicates ON or OFF of the trigger switch 117. Once the trigger switch 117 is turned ON, the control circuit 112 delivers the motor drive command to the motor drive circuit 111 thereby to drive the motor 12.

The control circuit 112 may receive an operation amount signal that indicates a pull-operation amount of the trigger operating portion 9. In this case, the control circuit 112 may output the motor drive command in accordance with the operation amount signal (in other words, in accordance with the pull-operation amount). To output the motor drive command in accordance with the operation amount signal means to change drive parameters of the motor 12 (for example, a rotational torque and a rotational speed) in accordance with the pull-operation amount.

When driving the motor 12, the control circuit 112 refers to the signal the rotor position detection circuit 115 delivers and outputs the motor drive command corresponding to the rotational position of the rotor 90. The control circuit 112 monitors the temperature of the motor 12 based on the signal received from the temperature detection circuit 114. The control circuit 112 executes a protection process corresponding to the temperature of the motor 12. The protection process may include, for example, a process to reduce the rotational speed of the motor 12 or to stop the rotation of the motor 12 in a case the temperature of the motor 12 reaches or exceeds a given temperature.

(1-3) Detailed Configuration of Motor

More detailed configuration of the motor 12 will be given below with reference to FIG. 4 to FIG. 6. As shown in FIG.

Figure 4:
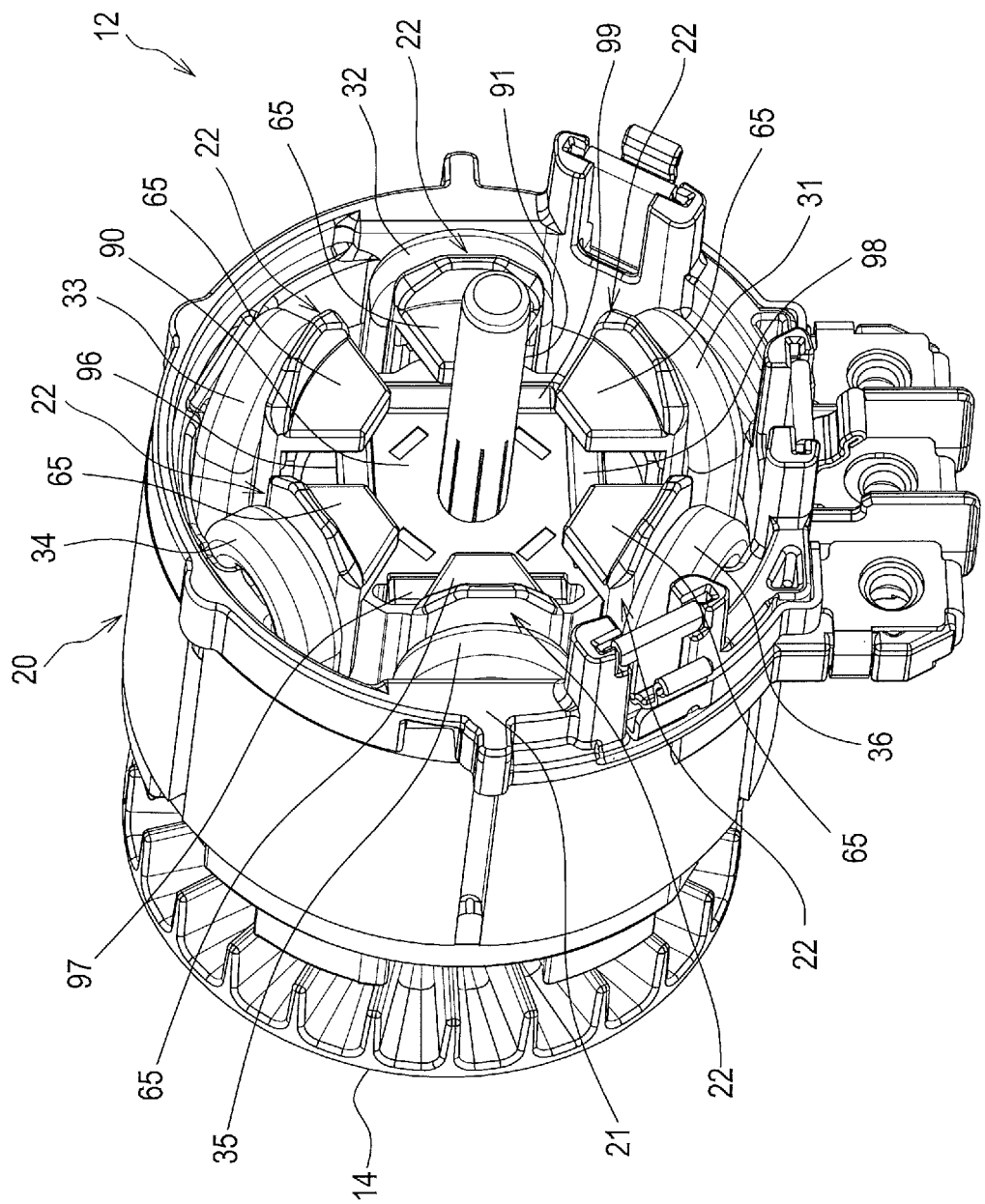
FIG. 4 is a perspective view of a motor in the embodiment.
Figure 5:
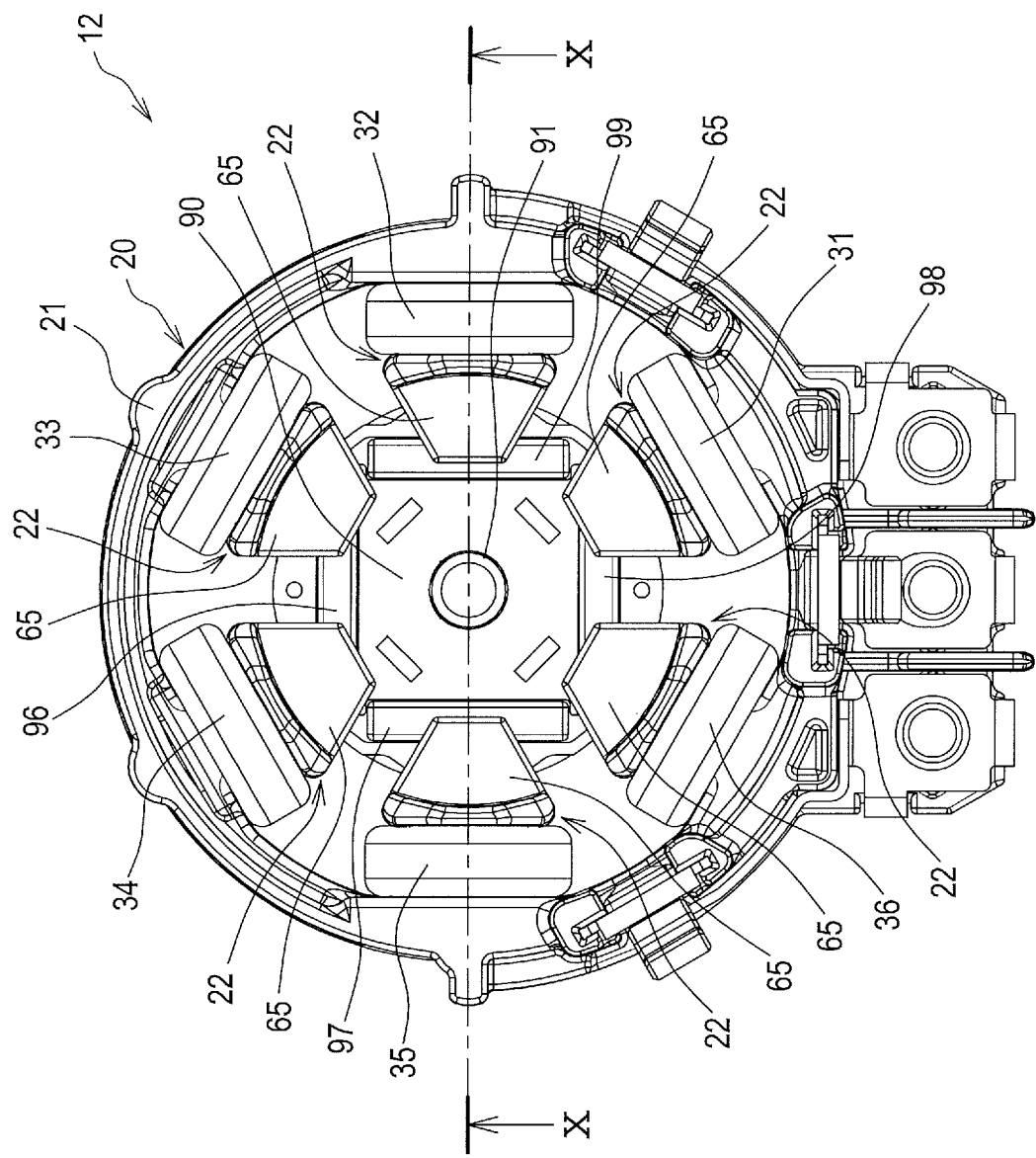
FIG. 5 is a front view of the motor in the embodiment.

4 and FIG. 5, the motor 12 includes a stator 20 and the rotor 90. FIG. 4 describes the fan 14 that is rotated by the motor 12.

As it is obvious from the positional relationship between the motor 12 and the fan 14 in FIG. 4, FIG. 4 is a view of the motor 12 taken from a side where the driving mechanism 13 is disposed, which is opposite to the side where the fan 14 is disposed.

The rotor 90 has an approximately cylindrical shape. The rotor 90 internally includes permanent magnets. More specifically, the rotor 90 in the present embodiment includes four magnets 96, 97, 98, and 99. The magnets 96, 97, 98, 99 are arranged in the rotational direction of the rotor 90 and apart from one another with equal interval angles (for example, every 90 degrees in the present embodiment) in the rotational direction. The magnets 96, 97, 98, 99 are long-plate shaped, for example.

The rotor 90 rotates in response to a supply of an electric power from the controller 15 to the stator 20. The supply of an electric power to the stator 20 means that at least one of the aforementioned U-phase drive current, V-phase drive current, or W-phase drive current is supplied to the stator 20.

As shown in FIG. 4 and FIG. 5, the rotor 90 includes the shaft 91. The shaft 91 rotates integrally with the rotor 90. The shaft 91 is linked to the driving mechanism 13. The rotational driving force of the rotor 90 is transmitted to the driving mechanism 13 via the shaft 91.

The stator 20 includes a stator back-ring 21 and six stator teeth 22. Each stator tooth 22 includes a pedestal 65. The stator 20 further includes a first phase coil, a second phase coil, and a third phase coil. More specifically, the stator 20 includes a first coil 31, a second coil 32, a third coil 33, a fourth coil 34, a fifth coil 35, and a sixth coil 36.

The first phase coil includes any two coils among the first coil 31 to the sixth coil 36. Those two coils in the first phase coil are coupled in series with each other.

The second phase coil includes any two coils among the first coil 31 to the sixth coil 36 but distinct from those in the first phase coil. Those two coils in the second phase coil are coupled in series with each other.

The third phase coil includes any two coils among the first coil 31 to the sixth coil 36 but distinct from those in the first phase coil and the second phase coil. Those two coils in the third phase coil are coupled in series with each other.

Figure 6:
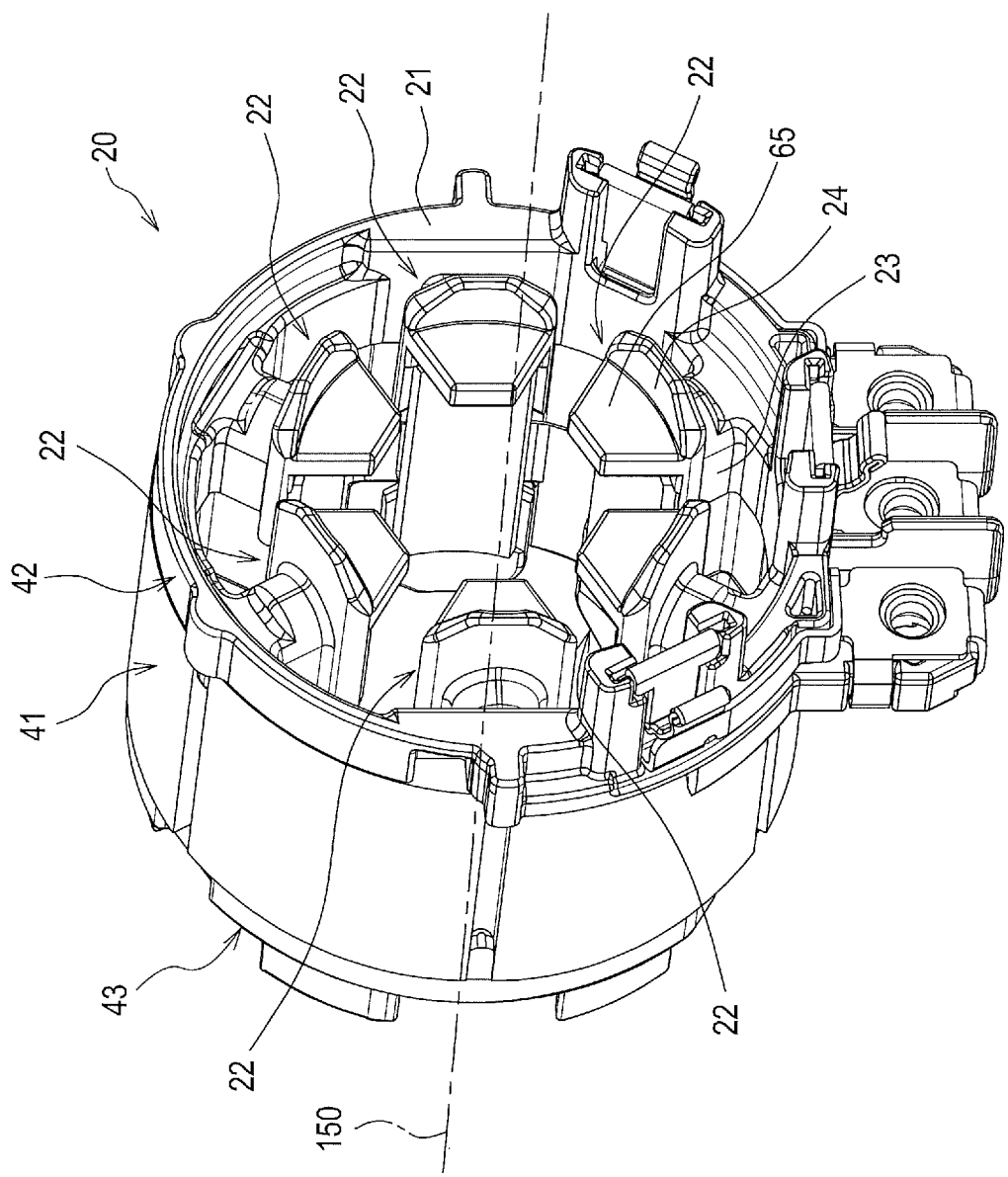
FIG. 6 is a perspective view of a stator with a coil removed.

As shown in FIG. 4 to FIG. 6, the stator back-ring 21 has a ring-shape (for example, a cylindrical shape with both ends open). The six stator teeth 22 are arranged on an inner circumferential surface of the stator back-ring 21 and apart from one another with equal intervals (for example, every 60 degrees) in a circumferential direction of the stator back-ring 21.

As shown in FIG. 6, each stator tooth 22 is disposed on the inner circumferential surface of the stator back-ring 21 to protrude towards a center axis 150 of the stator back-ring 21 (in other words, in a radial direction of the stator back-ring 21). The center axis 150 is the same as the rotational axis of the rotor 90, and thus is the same as a rotational axis of a shaft 91.

As shown in FIG. 6, each stator tooth 22 includes a stator tooth main body 23, a stator tooth end portion 24, and the pedestal 65. The stator tooth main body 23 stands on the inner circumferential surface of the stator back-ring 21 to protrude towards the center axis 150.

The stator tooth end portion 24 is situated on an end part of the protruding stator tooth main body 23 facing the center axis 150. The stator tooth end portion 24 has an approximately plate shape. An area of a section of the stator tooth end portion 24 perpendicular to the radial direction is larger than an area of a section of the stator tooth main body 23 perpendicular to the radial direction. In other words, the stator tooth end portion 24 is disposed to form a flange on the stator tooth main body 23.

Each pedestal 65 has an approximately trapezoidal plate shape. The pedestal 65 is disposed to stand on a surface of the stator tooth end portion 24 in a direction crossing the surface (for example, a direction perpendicular to the surface). The surface of the stator tooth end portion 24 faces the center axis 150 (in other words, facing the rotor 90). The pedestal 65 is disposed so that a plane parallel to the plate surface of the pedestal 65 crosses the center axis 150. More specifically, the pedestal 65 in the present embodiment is disposed such that, for example, the plate surface of the pedestal 65 is situated perpendicularly to the center axis 150. In a radial direction of the stator 20, each pedestal 65 is arranged in an area that is closer to the rotor 90 than an area where the coils 31 to 36 are disposed. In other words, in a radial view, each of the pedestals 65 are arranged in an area that is between the center axis 150 and the area where the coils 31 to 36 are disposed.

As shown in FIG. 4 and FIG. 5, in a direction along the center axis 150, the pedestals 65 are arranged outside of a region where the rotor 90 is situated. More specifically, in the direction along the center axis 150, the pedestals 65 are arranged closer to the driving mechanism 13 than the rotor 90 is. Each pedestal 65 includes a first plate surface facing an end surface of the rotor 90 that faces the driving mechanism 13. The pedestal 65 includes a second plate surface facing the front of the electric work machine 1.

Figure 8:
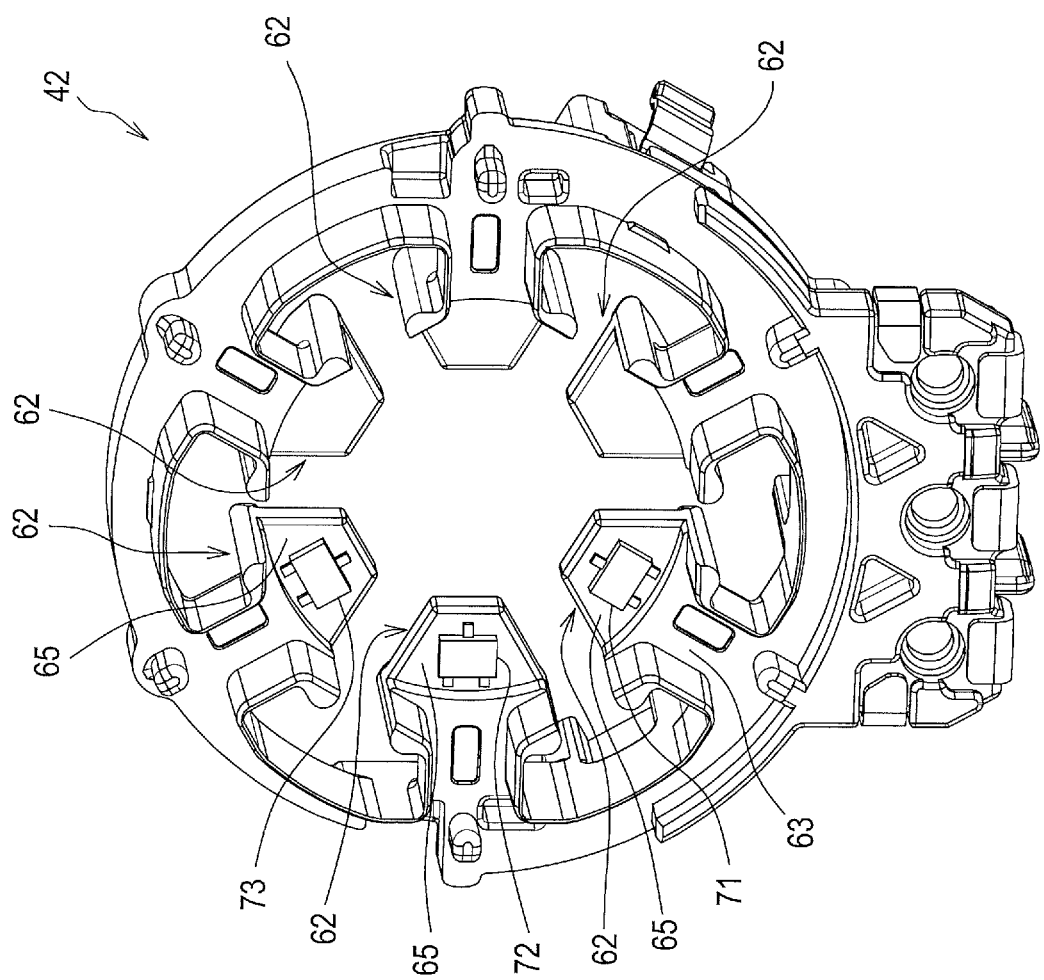
FIG. 8 is a perspective view of a first insulator.

As it will be explained later with reference to FIG. 8, in the present embodiment, three of the pedestals 65 each include one of the rotation sensors 71, 72, 73 on the first plate surface thereof.

As shown in FIG. 4 and FIG. 5, the first coil 31 to the sixth coil 36 are each disposed on one of the stator teeth 22. More specifically, the first coil 31 to the sixth coil 36 are each wound around the stator tooth main body 23 of the corresponding stator tooth 22.

In the present embodiment, the first phase coil, the second phase coil, and the third phase coil are connected in a delta configuration, for example. In other words, a first end of the first phase coil is coupled with a first end of the second phase coil and also with the motor drive circuit 111. The first end of the first phase coil is supplied with, for example, the aforementioned U-phase drive current from the motor drive circuit 111.

A second end of the first phase coil is coupled with a first end of the third phase coil and also with the motor drive circuit 111. The second end, of the first phase coil is supplied with, for example, the aforementioned V-phase drive current from the motor drive circuit 111.

A second end of the second phase coil is coupled with a second end of the third phase coil and also with the motor drive circuit 111. The second end of the second phase coil is supplied with, for example, the aforementioned W-phase drive current from the motor drive circuit 111.

In the present embodiment, for example, the first coil 31 and the fourth coil 34 are coupled in series with each other, and included in the first phase coil. For example, the second coil 32 and the fifth coil 35 are coupled in series with each other, and included in the second phase coil. For example, the third coil 33 and the sixth coil 36 are coupled in series with each other, and included in the third phase coil.

The first phase coil, the second phase coil, and the third phase coil may be coupled with one another in a connection different from the delta configuration (for example, a star configuration).

Figure 7:
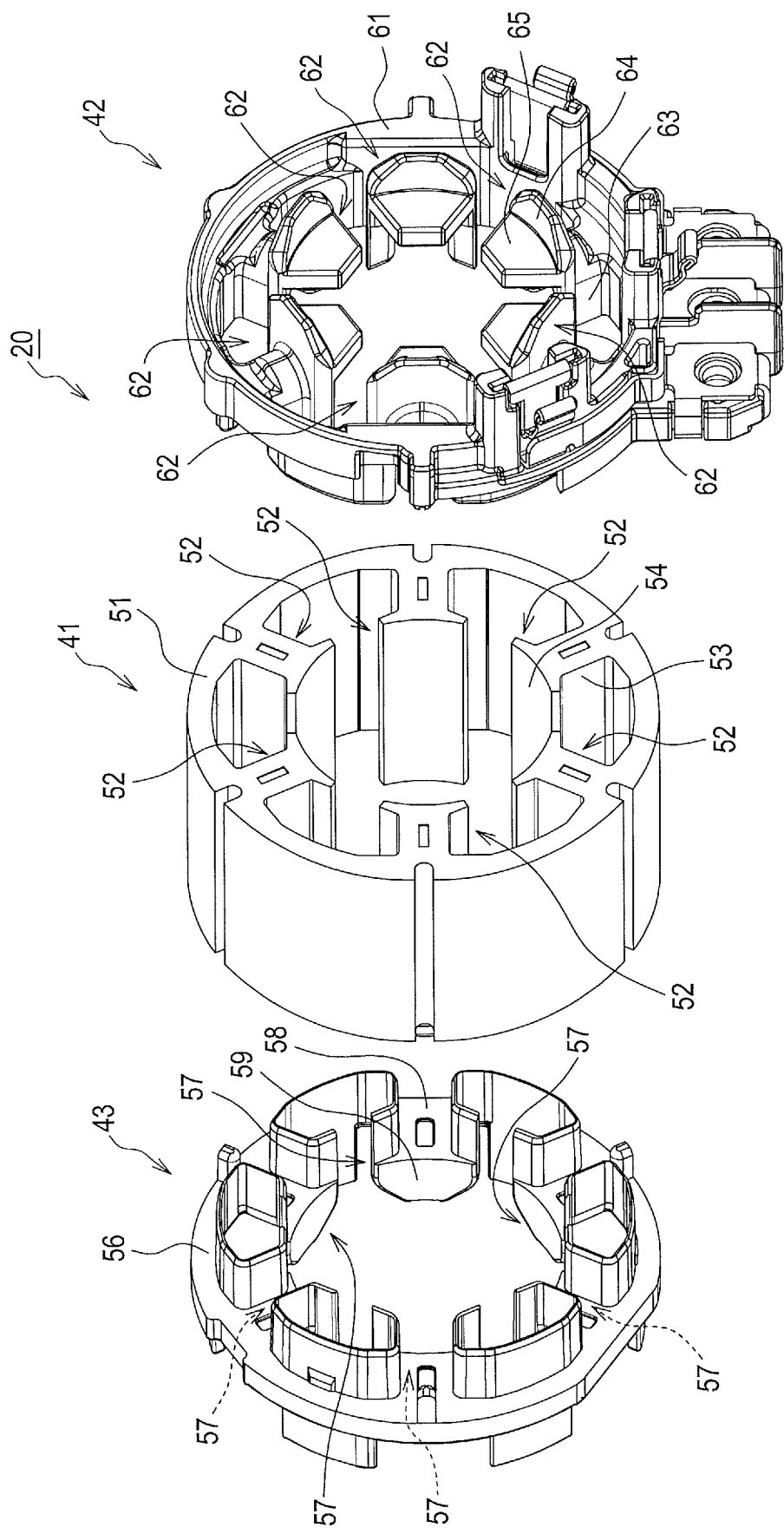
FIG. 7 is an exploded perspective view of the stator with the coil removed.

As shown in FIG. 6 and FIG. 7, in the present embodiment, the stator 20 includes a stator core 41, a first insulator 42, and a second insulator 43. The stator back-ring 21, and the six stator teeth 22 are formed of the first insulator 42, the stator core 41, and the second insulator 43 combined in this order.

With reference to FIG. 7, the stator core 41, the first insulator 42, and the second insulator 43 will be explained more specifically.

The stator core 41 contains a magnetic substance. The stator core 41 includes a back core 51 and six core teeth 52. The back core 51 is a part of the stator back-ring 21. A core tooth 52 is a part of the stator tooth 22.

The back core 51 has a ring-shape (for example, a cylindrical shape with both ends open). The six core teeth 52 are arranged on an inner circumferential surface of the back core 51 and apart from one another with equal intervals (for example, every 60 degrees) in a circumferential direction of the back core 51. Each core tooth 52 is disposed on the inner circumferential surface of the back core 51 to protrude towards a center axis of the back core 51 (that is, the aforementioned center axis 150).

Each core tooth 52 includes a core tooth main body 53 and a core tooth end portion 54. The core tooth main body 53 is a part of the stator tooth main body 23. The core tooth end portion 54 is a part of the stator tooth end portion 24.

The first insulator 42 and the second insulator 43 contain an insulating material. More specifically, in the present embodiment, the first insulator 42 and the second insulator 43 contain, for example, a material including resin as a primary component.

In the present embodiment, the first insulator 42 and the second insulator 43 are, for example, resin-molded members integrally molded from a material containing resin. The first insulator 42 and the second insulator 43 may contain, for example, thermosetting resin. The first insulator 42 and the second insulator 43 may contain, for example, thermoplastic resin. The first insulator 42 and the second insulator 43 may contain, for example, nothing but resin. The first insulator 42 and the second insulator 43 may contain, for example, resin and an insulating material other than resin. The first insulator 42 and the second insulator 43 may contain, for example, nothing but an insulating material other than resin.

The first insulator 42 and the second insulator 43 may be formed by any method. The first insulator 42 and the second insulator 43 may be formed by, for example, an injection molding method. The first insulator 42 and the second insulator 43 may be formed by a method different from the injection molding method. The first insulator 42 and the second insulator 43 may be formed of the same material, or may be formed of different materials.

As shown in FIG. 7, the first insulator 42 includes a first back-ring 61 and six first teeth 62. The first back-ring 61 is a part of the stator back-ring 21. A first tooth 62 is a part of the stator tooth 22.

The first back-ring 61 has a ring-shape (for example, a cylindrical shape with both ends open). The six first teeth 62 are arranged on an inner circumferential surface of the first back-ring 61 and apart from one another with equal intervals (for example, every 60 degrees) in a circumferential direction of the first back-ring 61. Each first tooth 62 is disposed on the inner circumferential surface of the first back-ring 61 to protrude towards a center axis of the first back-ring 61 (that is, the aforementioned center axis 150).

Each first tooth 62 includes a first tooth main body 63, a first tooth end portion 64, and the aforementioned pedestal 65. The first tooth main body 63 is a part of the stator tooth main body 23. One of the first coil 31 to the sixth coil 36 is allocated and wound around the first tooth main body 63. The first tooth end portion 64 is a part of the stator tooth end portion 24. The pedestal 65 is disposed on the first tooth end portion 64. In other words, the pedestal 65 contains an insulating material including resin as a primary component in the present embodiment.

As shown in FIG. 7, the second insulator 43 includes a second back-ring 56 and six second teeth 57. The second back-ring 56 is a part of the stator back-ring 21. A second tooth 57 is a part of the stator tooth 22.

The second back-ring 56 has a ring-shape (for example, a circular ring-shape). The six second teeth 57 are arranged on a surface of the second back-ring 56 and apart from each other with equal intervals (for example, every 60 degrees) in a circumferential direction of the second back-ring 56. Each second tooth 57 is disposed on the surface of the second back-ring 56 towards a center axis of the second back-ring 56 (that is, the aforementioned center axis 150).

Each second tooth 57 includes a second tooth main body 58 and a second tooth end portion 59. The second tooth main body 58 is a part of the stator tooth main body 23. The second tooth end portion 59 is a part of the stator tooth end portion 24.

As shown in FIG. 6 and FIG. 7, one stator tooth 22 of the stator 20 is formed by combining one core tooth 52, one first tooth 62 corresponding to the core tooth 52, and one second tooth 57 corresponding to the core tooth 52.

(1-4) Arrangement Position of Rotation Sensor

More detailed description of arrangement positions of the rotation sensors 71, 72, 73 in the motor 12 will be given below with reference to FIG. 8 to FIG. 10.

In the present embodiment, the rotation sensors 71, 72, 73 are disposed in an area of the stator 20 that is closer to the rotor 90 than the area where the coils 31 to 36 are disposed in the radial direction of the stator 20. In other words, in a radial view, the rotation sensors 71, 72, 73 are arranged in an area that is situated between the center axis 150 and the area where the coils 31 to 36 are disposed. More specifically, as shown in FIG. 8 to FIG. 10, each of the rotation sensors 71, 72, 73 is individually disposed on one of the six pedestals 65. Hereinafter, three pedestals 65 on which one of the rotation sensors 71, 72, 73 is disposed will each be called "sensor-installed pedestal 65".

Each of the rotation sensors 71, 72, 73 is disposed on the aforementioned first plate surface (that is, the surface facing the end surface of the rotor 90) of the allocated sensor-installed pedestal 65. Each of the rotation sensors 71, 72, 73 is disposed so that a plane parallel with the detection surface for detecting the magnetic field crosses the central axis 150. More specifically, each of the rotation sensors 71, 72, 73 in the present embodiment is disposed such that, for example, the detection surface for detecting the magnetic field is arranged parallel with the plate surface of the sensor-installed pedestal 65, in other words, such that the detection surface for detecting the magnetic field is perpendicular to the rotational axis of the rotor 90.

Figure 9:
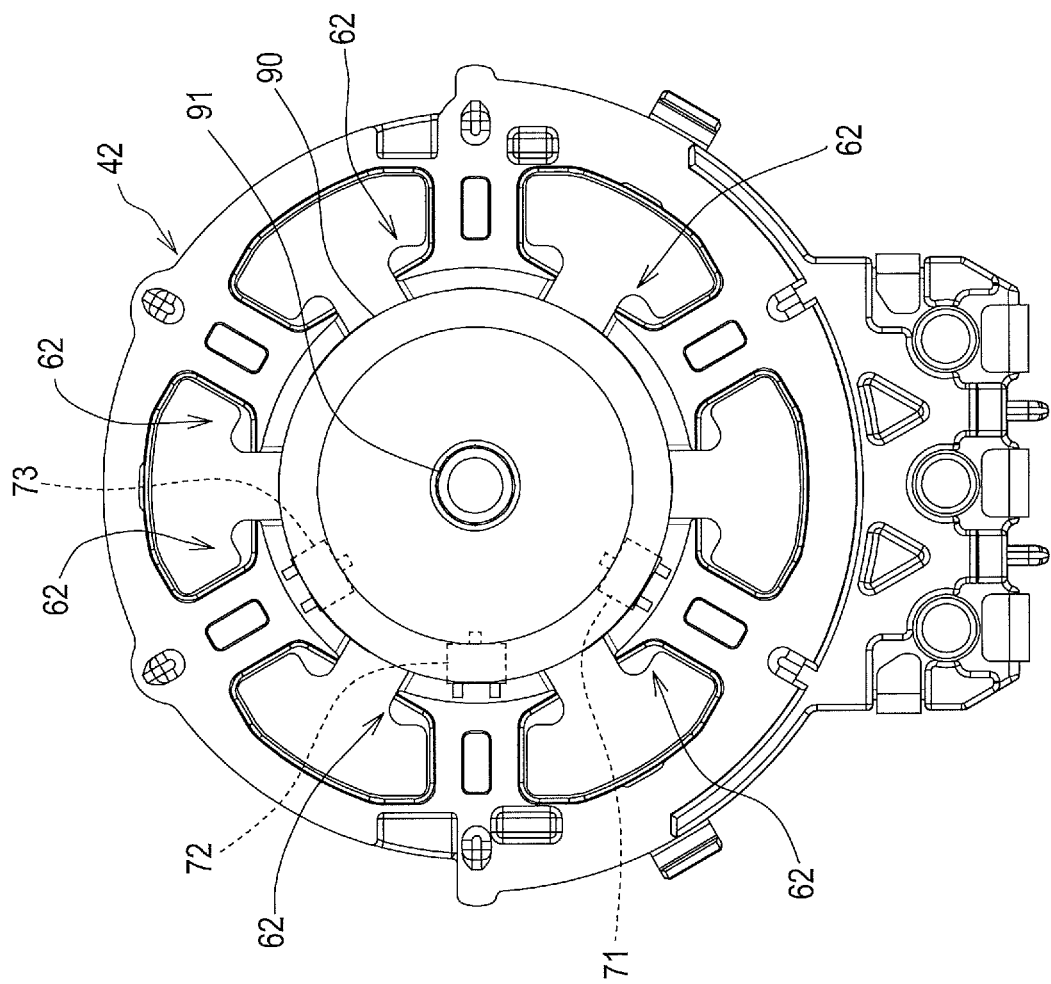
FIG. 9 is a partial rear view of the first insulator and a rotor in the motor.
Figure 10:
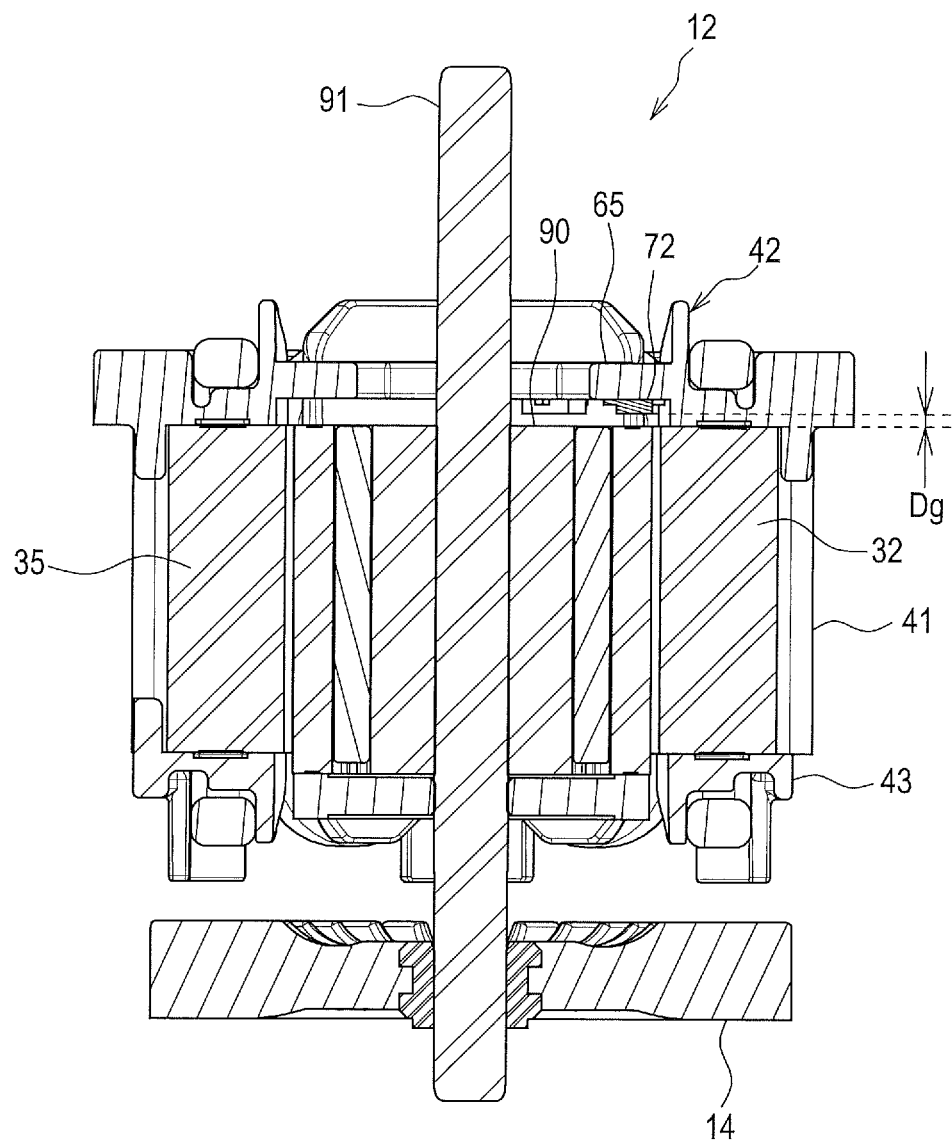
FIG. 10 is a cross-sectional view taken along line X-X in FIG. 5.

As shown in FIG. 9 and FIG. 10, the first plate surface of each of the rotation sensors 71, 72, 73 is entirely or almost entirely facing the end surface of the rotor 90. In other words, the rotation sensors 71, 72, 73 entirely or almost entirely overlap with the rotor 90 in a view of the motor 12 from outside looking in along the rotational axis as shown in FIG. 9. Thus, the detection surface of the Hall element on each of the rotation sensors 71, 72, 73 entirely or almost entirely faces the end surface of the rotor 90.

As shown in FIG. 10, the rotation sensors 71, 72, 73 are situated a distance Dg away from the rotor 90. In the present embodiment, the rotation sensors 71, 72, 73 are disposed in the first insulator 42. The first insulator 42 is one of the components to configure the motor 12. Thus, compared with a case where, for example, the rotation sensors 71, 72, 73 are disposed on a printed board that is provided separately from the motor 12, the rotor 90 can have a reduced overall length and a reduced distance Dg. In addition, since the rotation sensors 71, 72, 73 are disposed not on the printed board but directly on the first insulator 42, a tolerance of distance Dg can be reduced to a small value. This enables an improvement of the detection accuracy of the rotational positions.

Figure 11:
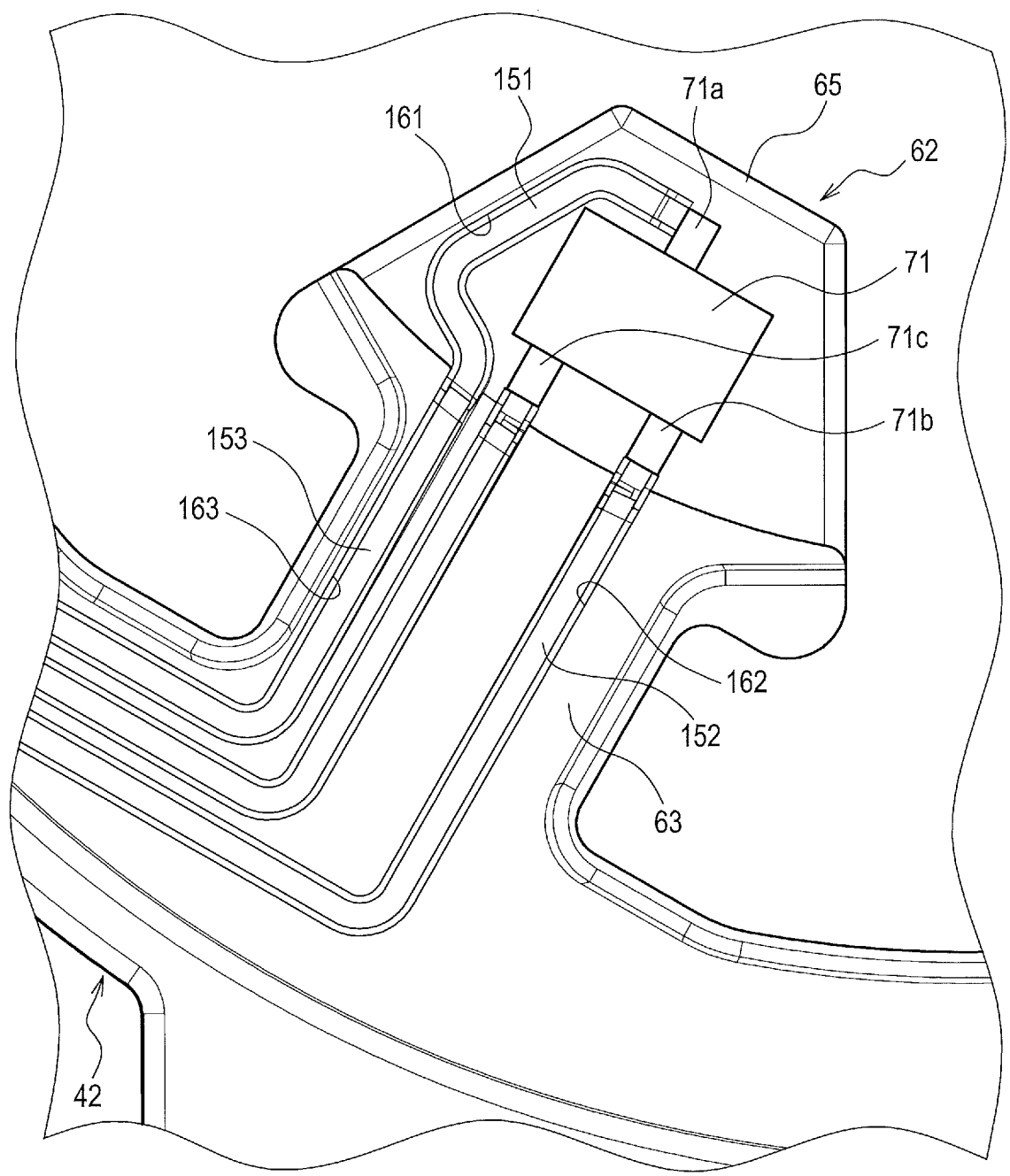
FIG. 11 is a partial rear view of the first insulator including a resin-wiring portion.
Figure 12:
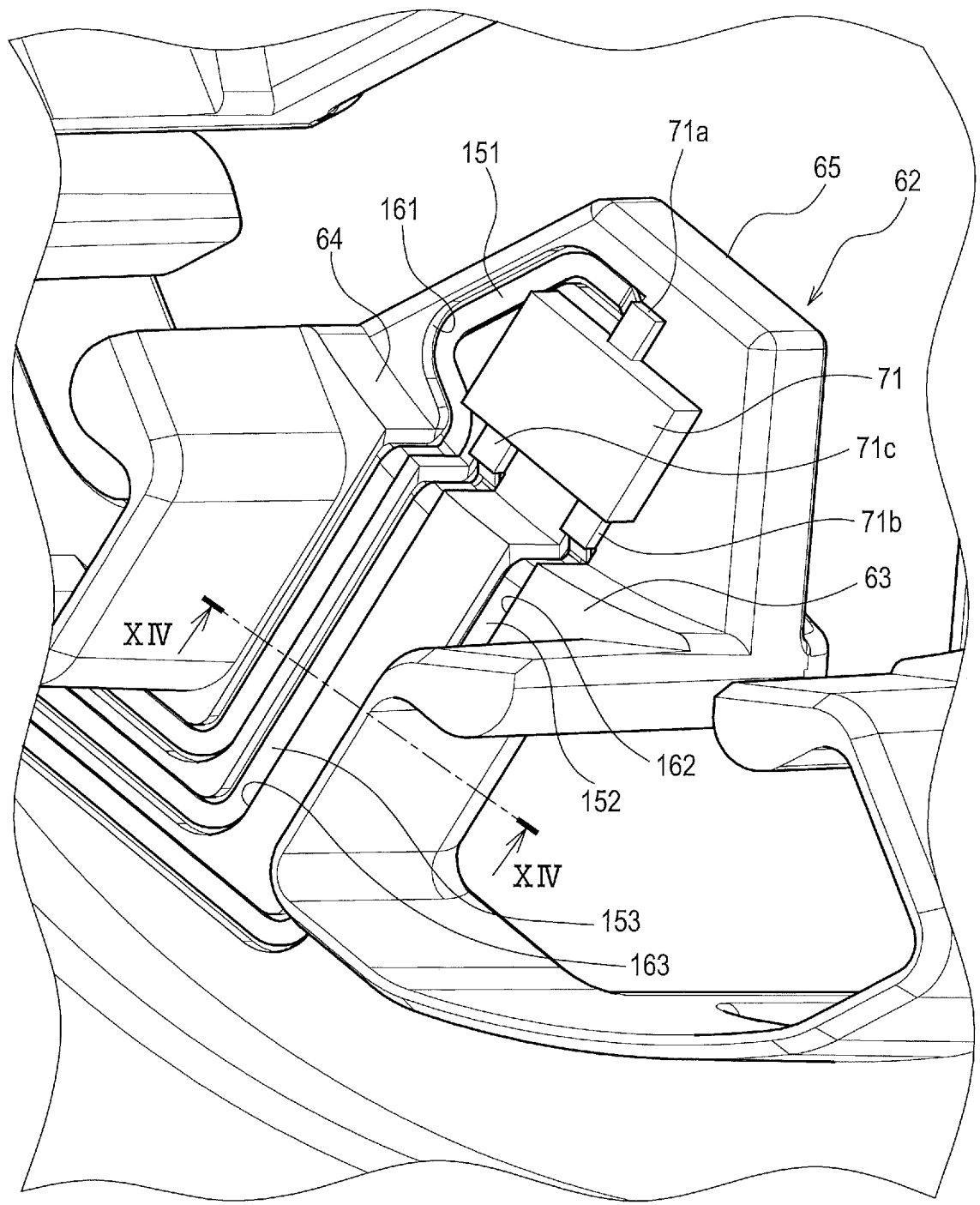
FIG. 12 is a partial perspective view of the first insulator including the resin-wiring portion.
Figure 14:
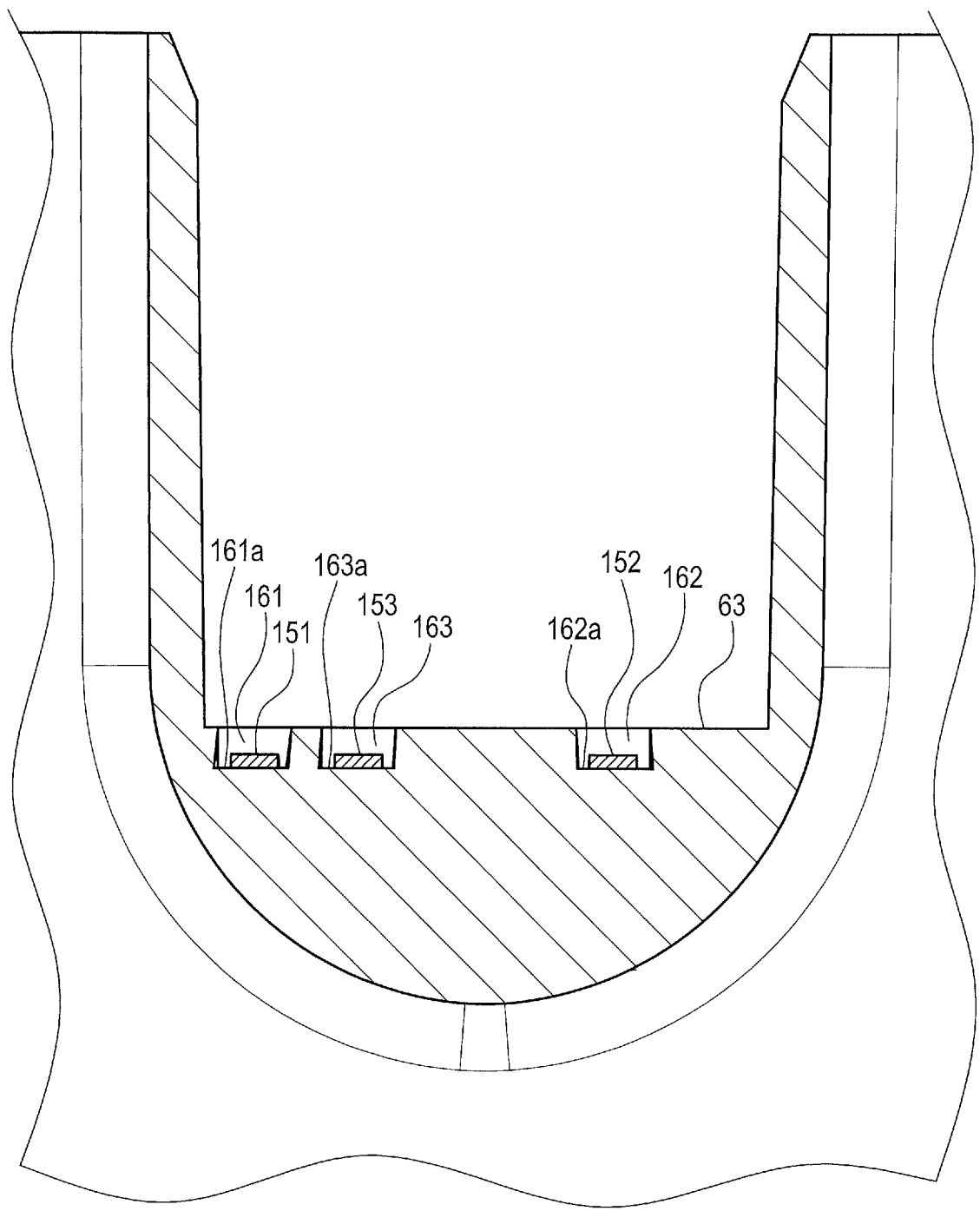
FIG. 14 is a cross-sectional view taken along line XIV-XIV in FIG. 12.

As shown in FIG. 11 and FIG. 12, the rotation sensor 71 includes terminals. More specifically, the rotation sensor 71 in the present embodiment includes, for example, a first terminal 71*a*, a second terminal 71*b*, and a third terminal 71*c*. Likewise the rotation sensor 71, each of the rotation sensors 72 and 73 also includes, for example, the first terminal 71*a*, the second terminal 71*b*, and the third terminal 71*c*. Each of the rotation sensors 71, 72, 73 is coupled with the controller 15 via the first terminal 71*a*, the second terminal 71*b*, and the third terminal 71*c*. As shown in FIG. 11, FIG. 12, and FIG. 14, a part of electrical wirings (conductors) for electrically coupling the controller 15 with the first terminal 71*a*, the second terminal 71*b*, and the third terminal 71*c* of the rotation sensor 71 is disposed on the first insulator 42, which includes a first surface of the sensor-installed pedestal 65. Hereinafter, a part of the aforementioned electrical wirings disposed on a rear surface of the first insulator 42 will be called a "resin-wiring portion".

As shown in FIGS. 11, 12, and 14, the resin-wiring portion for the rotation sensor 71 includes a first patterned wiring 151, a second patterned wiring 152, and a third patterned wiring 153.

A part of the rear surface of the first insulator 42, including a surface of the first tooth 62 on which the rotation sensor 71 is disposed, includes a first groove 161, a second groove 162, and a third groove 163. The first patterned wiring 151 is disposed on a bottom surface 161*a* of the first groove 161 (see FIG. 14). The second patterned wiring 152 is disposed on a bottom surface 162*a* of the second groove 162 (see FIG. 14). The third patterned wiring 153 is disposed on a bottom surface 163*a* of the third groove 163 (see FIG. 14).

The first groove 161 extends from a vicinity of the first terminal 71*a*. A first end of the first patterned wiring 151 is coupled with the first terminal 71*a*. A second end of the first patterned wiring 151 is coupled with the controller 15 via an unillustrated first wiring.

The second groove 162 extends from a vicinity of the second terminal 71*b*. A first end of the second patterned wiring 152 is coupled with the second terminal 71*b*. A second end of the second patterned wiring 152 is coupled with the controller 15 via an unillustrated second wiring.

The third groove 163 extends from a vicinity of the third terminal 71*c*. A first end of the third patterned wiring 153 is coupled with the third terminal 71*c*. A second end of the third patterned wiring 153 is coupled with the controller 15 via an unillustrated third wiring.

The first groove 161, the second groove 162, and the third groove 163 extend from the first surface of the sensor-installed pedestal 65 to a given position via a surface of the first tooth end portion 64 and a surface of the first tooth main body 63. The first groove 161, the second groove 162, and the third groove 163 may be, for example, formed when the first insulator 42 is integrally molded by the injection molding or the like.

The first patterned wiring 151, the second patterned wiring 152, and the third patterned wiring 153 may be formed by any method. In the present embodiment, the first patterned wiring 151, the second patterned wiring 152, and the third patterned wiring 153 are, for example, formed integrally with the first insulator 42.

In other words, in the present embodiment, the first insulator 42 is one kind of Molded Interconnect Devices (MID). The MID means resin-molded member with a patterned conductor formed thereon. On the first insulator 42, the first patterned wiring 151, the second patterned wiring 152, and the third patterned wiring 153 correspond to patterned conductors on the MID.

The MID may be formed by various methods. One known method of forming the MID is a Laser Direct Structuring (LDS) method. The first patterned wiring 151, the second patterned wiring 152, and the third patterned wiring 153 may be formed on the first insulator 42 by the LDS method for example.

A part of a manufacturing process of the first insulator 42 that includes the rotation sensor 71 and the corresponding resin-wiring portion will be schematically explained. The manufacturing process includes, for example, a first step, a second step, and a third step as described below.

Figure 13:
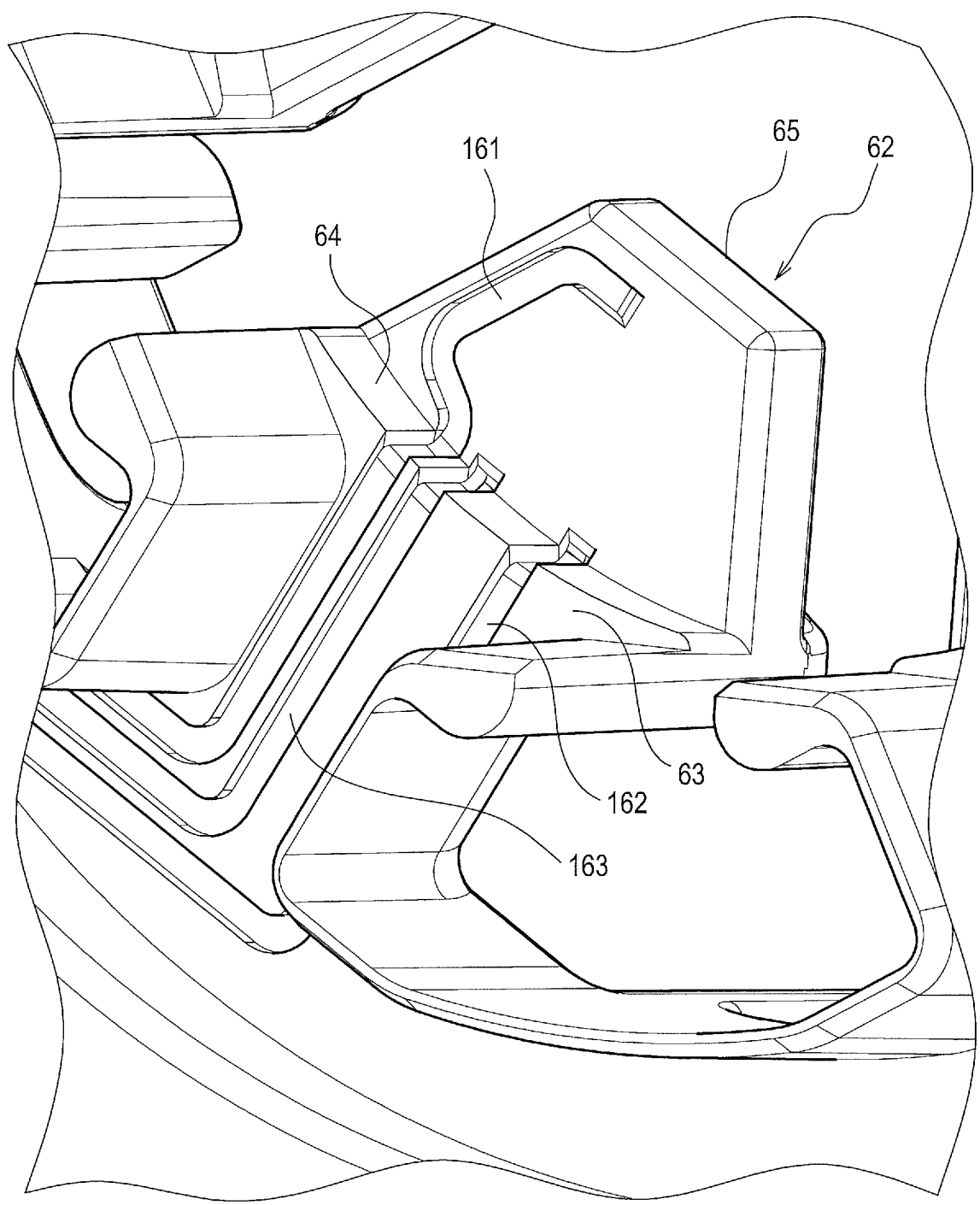
FIG. 13 is a partial rear view of the first insulator prior to placement of the resin-wiring portion.

In a first process, the first insulator 42 is molded by the injection molding for example. FIG. 13 shows a part of the first insulator 42 at the completion of the first process. As shown in FIG. 13, at the completion of the first process, the first groove 161, the second groove 162, and the third groove 163 are formed, but the rotation sensor 71 and the corresponding resin-wiring portion is not yet formed.

In a second process, the rotation sensor 71 is installed on the first surface of the sensor-installed pedestal 65.

In a third process, the first patterned wiring 151, the second patterned wiring 152, and the third patterned wiring 153 are formed by the LDS method for example. In the third process, the first end of the first patterned wiring 151 is coupled with the first terminal 71*a*; the first end of the second patterned wiring 152 is coupled with the second terminal 71*b*; and the first end of the third patterned wiring 153 is coupled with the third terminal 71*c*. FIGS. 11, 12, and 14 illustrate the first insulator 42 at the completion of the third process.

The rotation sensor 72 and the corresponding resin-wiring portion are also disposed in the same manner as the rotation sensor 71 and the corresponding resin-wiring portion as mentioned above. The rotation sensor 73 and the corresponding resin-wiring portion are also disposed in the same manner as the rotation sensor 71 and the corresponding resin-wiring portion as mentioned above. In FIG. 8, illustrations of the aforementioned resin-wiring portions are omitted.

(1-5) Effect of Embodiment

According to the embodiment mentioned above, the following effects (1*a*) to (1*g*) are attained.

(1*a*) In the electric work machine 1 in the present embodiment, the rotation sensors 71, 72, 73 are installed on the stator 20. In addition, in the radial direction of the stator 20, the rotation sensors 71, 72, 73 are disposed in the area that is closer to the rotor 90, which is the area closer to the center axis 150, than the area where the first coil 31 to the sixth coil 36 are disposed. This makes it possible to dispose the rotation sensors 71, 72, 73 near the rotor without increasing the size of the rotor 90. Accordingly, the rotational position of the rotor 90 can be accurately detected with the rotation sensors 71, 72, 73.

(1b) In the electric work machine 1 in the present embodiment, the rotation sensors 71, 72, 73 are installed on the first insulator 42. Accordingly, installment of the rotation sensors 71, 72, 73 in the motor 12 can be simplified.

(1c) In the electric work machine 1 in the present embodiment, each of the rotation sensors 71, 72, 73 is installed on the first tooth 62 of the first insulator 42. This enables the rotation sensors 71, 72, 73 to be easily disposed closer to the rotor 90 than the first coil 31 to the sixth coil 36 are.

(1d) In the electric work machine 1 in the present embodiment, the pedestal 65 is disposed on the end part of the first tooth 62. Each of the rotation sensors 71, 72, 73 is installed on the pedestal 65. This enables the rotation sensors 71, 72, 73 to be infallibly and stably disposed closer to the rotor 90 than the first coil 31 to the sixth coil 36 are.

(1e) In the electric work machine 1 in the present embodiment, the pedestal 65 is disposed outward of the rotor 90 in the direction along the rotational axis of the rotor 90. In addition, the pedestal 65 is disposed so that the plate surface of the pedestal 65 faces the end surface of the rotor 90. This enables each of the rotation sensors 71, 72, 73 to be easily installed on the pedestal 65. This further enables the rotation sensors 71, 72, 73 to be disposed to face the end surface of the rotor 90. Accordingly, the rotation sensors 71, 72, 73 can detect changes in the magnetic field caused by the rotation of the rotor 90 with an increased properness.

(1f) In the electric work machine 1 in the present embodiment, the pedestal 65 is disposed such that the plate surface of the pedestal 65 is perpendicular to the rotational axis of the rotor 90. Accordingly, it is possible to properly detect the rotational position of the rotor 90 while inhibiting an increase in size of the motor 12 caused by disposing the pedestal 65 and the rotation sensors 71, 72, 73 in the motor 12.

The chuck sleeve 8 corresponds to one example of the driver in the present disclosure. The stator back-ring 21 corresponds to one example of the cylindrical body in the present disclosure. The stator tooth 22 corresponds to one example of the tooth in the present disclosure. Each of the first coil 31 to the sixth coil 36 corresponds to one example of the coil in the present disclosure. The first insulator 42 corresponds to one example of the insulator in the present disclosure. The back core 51 corresponds to one example of the core tubular body in the present disclosure. The core tooth 52 corresponds to one example of the core tooth in the present disclosure. The first back-ring 61 corresponds to one example of the insulator tubular body in the present disclosure. The first tooth 62 corresponds to one example of the insulator tooth in the present disclosure. The first tooth main body 63 of the first tooth 62 corresponds to one example of the tooth main body in the present disclosure. The first tooth end portion 64 of the first tooth 62 corresponds to one example of the end portion of the present disclosure.

2. Other Embodiments

An embodiment of the present disclosure has been explained above. Nevertheless, the present disclosure can be carried out in various modifications without being limited to the aforementioned embodiment.

Figure 15:
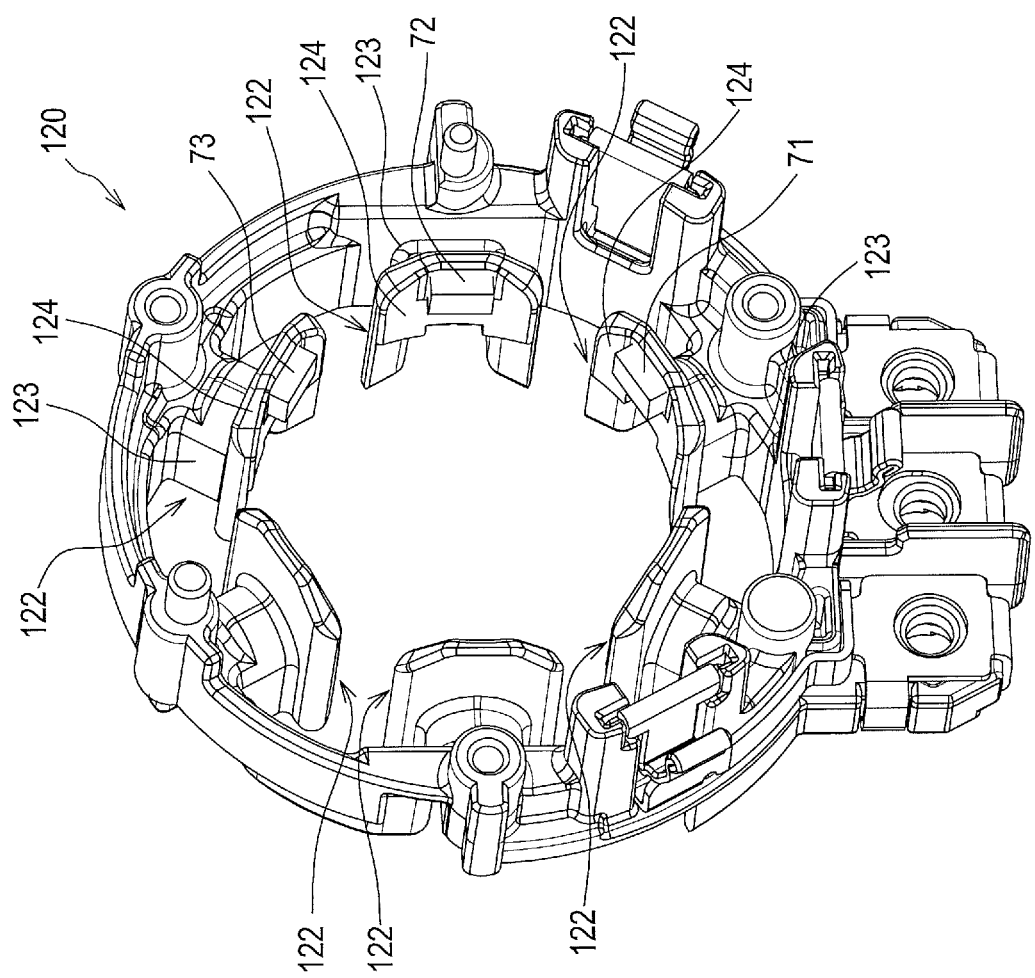
FIG. 15 is a perspective view showing a different arrangement example of rotation sensors.

(2-1) The rotation sensors may be disposed in any place of the stator within a range that is closer to the rotor than the coils are. FIG. 15 shows a different arrangement example of the rotation sensors. In FIG. 15, a first insulator 120 includes six first teeth 122. Each of the first teeth 122 includes a first tooth main body 123 and a first tooth end portion 124. The first tooth main body 123 is the same as the first tooth main body 63 in the aforementioned embodiment (see FIG. 7). The first tooth end portion 124 is the same as the first tooth end portion 64 in the aforementioned embodiment. Each first tooth 122 is different from the first tooth 62 in the aforementioned embodiment and does not include the pedestal 65. Each of the rotation sensors 71, 72, 73 is installed on a surface of the first tooth end portion 124 of the first tooth 62.

The rotation sensors 71, 72, 73 may be installed in positions different from those of the aforementioned embodiment or those shown in FIG. 15.

(2-2) The motor may be provided with two or less rotation sensors for example, or four or more rotation sensors for example.

(2-3) In the aforementioned embodiment, each of the six stator teeth 22 includes the pedestal 65; nevertheless, not all of the stator teeth 22 have to include the pedestal 65. For example, the pedestal 65 may be disposed only on the stator tooth 22 that is provided to install the rotation sensor.

(2-4) The pedestal may have any shape. The pedestal may be disposed at any position on the stator tooth 22.

(2-5) It is not necessary to arrange the rotation sensors 71, 72, 73 such that they entirely or almost entirely overlap with the rotor 90 in a view of the motor 12 along the center axis 150. The rotation sensors 71, 72, 73 may be arranged not to overlap with the rotor 90 in a view of the motor 12 along the center axis 150.

(2-6) Each of the rotation sensors 71, 72, 73 may include a magnetic field detection element different from the Hall element. Specifically, each of the rotation sensors 71, 72, 73 may include, for example, a magnetoresistive sensor. In other words, each of the rotation sensors 71, 72, 73 may have any configuration or may use any method to detect changes in the magnetic field caused in response to the changes in the rotational position of the rotor 90. Each of the rotation sensors 71, 72, 73 may have any configuration or may use any method to output a rotation detection signal in accordance with the detected changes in the magnetic field.

(2-7) The rotor 90 may include any number of permanent magnets. The permanent magnets may be arranged in the rotor 90 in any manner.

(2-8) The motor 12 in the aforementioned embodiment is a so-called inner-rotor type motor. Nevertheless, the present disclosure may be applied to an outer-rotor type motor.

The outer-rotor type motor includes a stator, and a rotor disposed radially outside of the stator. The stator includes a cylindrical body, teeth, and coils. The teeth are disposed to stand on an outer circumferential surface of the cylindrical body. Each coil is wound around one of the teeth. Each coil generates a magnetic force in response to receiving an electric power. The present discloser may be applied to the outer-rotor type motor configured as above. More specifically, in a radial view of the stator, the rotation sensors may be arranged in a region closer to the rotor than the region where the coils are situated, that is, a region outside (close to an outer circumference) of the region where the coils are situated.

(2-9) The motor 12 may be a motor other than a brushless motor. The electric work machine 1 may operate with an electric power distinct from the battery power. For example, the electric work machine 1 may include a motor that is configured to accept commercial 100V AC power input and that is able to be driven by the AC power.

(2-10) In the aforementioned embodiment, the rechargeable impact driver was described as one example of the electric work machine. Nevertheless, the technique in the present disclosure may be applied to other electric work machines that are configured to operate on a target. The target of operation may be any substances, for example, various workpieces such as woods, metals, and plastics; various fasteners such as screws, nails, and nuts; plants; dusts; gasses; and liquids. The electric work machine may include any driven member. A driven member may operate on the target of operation in any ways. The driven member may be, for example, a drill bit that works to make a hole in the workpiece; a rotary blade that works to cut the workpiece; a grinding stone that works to polish the workpiece; and a rotary wing that works to let gasses or liquids in or out.

The technique in the present disclosure may be applied to various job-site electric apparatus used at a work site of, for example, home carpentry, manufacturing, gardening, and construction. More specifically, the technique in the present disclosure may be applied to various electric work machines having a driven member, for example, an electric power tool for stone processing, metal processing, or wood processing; a work machine for gardening; and a device for improving a work site environment. More particularly, the present disclosure may be applied to various electric work machines, for example, an electric hammer; an electric hammer drill; an electric drill; an electric screwdriver; an electric wrench; an electric grinder; an electric circular saw; an electric reciprocating saw; an electric jigsaw; an electric cutter; an electric chainsaw; an electric planer; an electric nailer (including a tacker); an electric hedge trimmer; an electric lawn mower; an electric lawn trimmer; an electric grass cutter; an electric cleaner; an electric blower; an electric sprayer; an electric spreader; and an electric dust collector.

(2-11) Two or more functions achieved by one element of the aforementioned embodiment may be achieved by two or more elements; and, one function achieved by one element may be achieved by two or more elements. Two or more functions achieved by two or more elements may be achieved by one element; and one function achieved by two or more elements may be achieved by one element. A part of the configurations of the aforementioned embodiments may be omitted. An element in any one of the aforementioned embodiments may be added to or replaced in another embodiment.

The invention claimed is:

1. An electric work machine comprising:
a motor including:
a stator including:
a cylindrical body including a first inner circumferential surface and a first outer circumferential surface;
a tooth including:
a first tooth main body (i) protruding from the first inner circumferential surface or the first outer circumferential surface in a radial direction of the cylindrical body and (ii) including a first radially protruding end; and
a first end portion (i) in the first radially protruding end and (ii) including a flange; and
a coil (i) wound around the tooth and (ii) configured to generate a magnetic force in response to receiving an electric power; and
a rotor including a permanent magnet;
a driver configured (i) to receive a rotational force transmitted from the motor and (ii) to drive a driven member with the rotational force, the driven member being configured to perform work on a target of operation in response to being driven by the driver; and
a rotation sensor (i) on the tooth, (ii) closer to the rotor than the coil and the first end portion in the radial direction, and (iii) configured to output a signal in accordance with a rotational position of the motor, wherein:
the rotor includes a rotational axis and an end surface, the rotational axis intersecting the end surface, and
the rotation sensor is spaced from the end surface along the rotation axis.

2. The electric work machine according to claim 1, wherein the stator includes:
a stator core (i) containing a magnetic substance and (ii) integrated with the cylindrical body and the tooth; and
an insulator (i) containing resin, (ii) integrated with the cylindrical body and the tooth, and (iii) adjacent to the stator core along a rotational axis of the rotor, and
wherein the rotation sensor is on the insulator.

3. The electric work machine according to claim 2, wherein the stator core includes:
a core tubular body integrated with the cylindrical body; and
a core tooth integrated with the tooth,
wherein the insulator includes:
an insulator tubular body integrated with the cylindrical body; and
an insulator tooth integrated with the tooth, and
wherein the rotation sensor is on the insulator tooth.

4. The electric work machine according to claim 3, wherein the insulator tooth includes:
a second tooth main body (i) integrated with the first tooth main body and (ii) including a portion of the first radially protruding end; and
a second end portion integrated with the first end portion, and
wherein the rotation sensor is on the second end portion.

5. The electric work machine according to claim 1, wherein the motor is an inner-rotor type motor.

6. An electric work machine comprising:
a motor including:
a stator including:
a cylindrical body including a first inner circumferential surface and a first outer circumferential surface;
a tooth including:
a first tooth main body (i) protruding from the first inner circumferential surface or the first outer circumferential surface in a radial direction of the cylindrical body and (ii) including a first radially protruding end; and
a first end portion (i) in the first radially protruding end and (ii) including a flange; and a coil (i) wound around the tooth and (ii) configured to generate a magnetic force in response to receiving an electric power; and
a rotor including a permanent magnet;
a driver configured (i) to receive a rotational force transmitted from the motor and (ii) to drive a driven member with the rotational force, the driven member being configured to perform work on a target of operation in response to being driven by the driver; and
a rotation sensor (i) on the tooth, (ii) closer to the rotor than the coil and the first end portion in the radial direction, and (iii) configured to output a signal in accordance with a rotational position of the motor, wherein:
the stator includes:
a stator core (i) containing a magnetic substance and (ii) integrated with the cylindrical body and the tooth; and
an insulator (i) containing resin, (ii) integrated with the cylindrical body and the tooth, and (iii) adjacent to the stator core along a rotational axis of the rotor,
the stator core includes:
a core tubular body integrated with the cylindrical body; and
a core tooth integrated with the tooth,
the insulator includes:
an insulator tubular body integrated with the cylindrical body; and
an insulator tooth integrated with the tooth,
the insulator tooth includes:
a second tooth main body (i) integrated with the first tooth main body and (ii) including a portion of the first radially protruding end;
a second end portion integrated with the first end portion; and
a pedestal (i) having a plate shape and (ii) extending from the second end portion in the radial direction, and
the rotation sensor is on the pedestal.

7. An electric work machine comprising:
a motor including:
a stator including:
a cylindrical body including a first inner circumferential surface and a first outer circumferential surface;
teeth protruding from the first inner circumferential surface or the first outer circumferential surface in a radial direction of the cylindrical body; and
coils configured to generate a magnetic force in response to receiving an electric power, each coil of the coils being wound around an allocated tooth of the teeth; and
a rotor including a permanent magnet;
a driver configured (i) for an attachment of a driven member, (ii) to receive a rotational force transmitted from the motor, and (iii) to drive the driven member attached to the driver with the rotational force, the driven member being configured to operate on a target of operation in response to being driven by the driver; and
a rotation sensor (i) on the stator, (ii) configured to output a signal in accordance with a rotational position of the motor, and (iii) closer to the rotor than the coils in a radial direction of the stator, wherein:

the stator includes:
a stator core (i) containing a magnetic substance and (ii) corresponding to a first portion of the cylindrical body and a first portion of each tooth of the teeth; and
an insulator (i) including resin, (ii) corresponding to a second portion of the cylindrical body and a second portion of the each tooth of the teeth, and (iii) adjacent to the stator core along a rotational axis of the rotor,
the stator core includes:
a core tubular body corresponding to the first portion of the cylindrical body; and
core teeth, each of the core teeth corresponding to the first portion of each tooth of the teeth,
the insulator includes:
an insulator tubular body corresponding to the second portion of the cylindrical body; and
insulator teeth, each of the insulator teeth corresponding to the second portion of each tooth of the teeth,
the insulator tubular body includes:
a second inner circumferential surface corresponding to a part of the first inner circumferential surface; and
a second outer circumferential surface corresponding to a part of the first outer circumferential surface,
each insulator tooth of the insulator teeth includes:
a tooth main body (i) protruding from the second inner circumferential surface or the second outer circumferential surface in a radial direction of the insulator tubular body, (ii) wound by an allocated coil of the coils, and (iii) including a radially protruding end; and
an end portion forming a flange and in the radially protruding end,
the insulator teeth includes a first insulator tooth having the rotation sensor thereon,
the first insulator tooth includes a pedestal (i) having a plate shape, (ii) extending from the end portion in the radial direction of the insulator tubular body, and (iii) including a plate surface facing an end surface of the rotor, and
the rotation sensor is on the pedestal.

8. The electric work machine according to claim 7, wherein the rotational axis of the rotor crosses a plane parallel with the plate surface.

9. The electric work machine according to claim 8, wherein the plate surface is perpendicular to the rotational axis of the rotor.

10. An electric work machine comprising:
a motor including:
a stator including:
a cylindrical body including a first inner circumferential surface and a first outer circumferential surface;
a tooth including:
a first tooth main body (i) protruding from the first inner circumferential surface or the first outer circumferential surface in a radial direction of the cylindrical body and (ii) including a first radially protruding end; and
a first end portion (i) in the first radially protruding end and (ii) including a flange; and
a coil (i) wound around the tooth and (ii) configured to generate a magnetic force in response to receiving an electric power; and
a rotor including a permanent magnet;
a driver configured (i) to receive a rotational force transmitted from the motor and (ii) to drive a driven member with the rotational force, the driven member being configured to perform work on a target of operation in response to being driven by the driver; and a rotation sensor (i) on the tooth, (ii) closer to the rotor than the coil and the first end portion in the radial direction, and (iii) configured to output a signal in accordance with a rotational position of the motor, wherein:

the rotor includes a rotational axis and an end surface, the rotational axis intersecting the end surface, and the rotation sensor faces the end surface along the rotational axis.

11. An electric work machine comprising:
a motor including:
    a stator including:
        a stator core containing a magnetic substance; and
        an insulator containing resin, the insulator including:
            an insulator tubular body; and
            an insulator tooth protruding from the insulator tubular body in a radial direction of the insulator tubular body; and
    a coil (i) wound around the insulator tooth and (ii) configured to generate a magnetic force in response to receiving an electric power; and
    a rotor including a permanent magnet;
a driver configured (i) to receive a rotational force transmitted from the motor and (ii) to drive a driven member with the rotational force, the driven member being configured to perform work on a target of operation in response to being driven by the driver;
a rotation sensor (i) on the insulator tooth and (ii) configured to output a signal in accordance with a rotational position of the motor; and
a conductive track (i) coupling the rotation sensor to a controller and (ii) including a first partial conductive track on the insulator tooth, wherein:

the rotor includes a rotational axis and an end surface, the rotational axis intersecting the end surface, and the rotation sensor is spaced from the end surface along the rotational axis.

12. The electric work machine according to claim 11, wherein the rotation sensor is closer to the rotor than the coil in the radial direction.

13. The electric work machine according to claim 11, wherein the insulator tooth includes:
    a tooth main body (i) protruding from the insulator tubular body in the radial direction, (ii) including a radially protruding end, and (iii) wound by the coil;
    an end portion (i) in the radially protruding end and (ii) including a flange; and
    a pedestal (i) having a plate shape and (ii) extending from the end portion in the radial direction, and
wherein the rotation sensor and the first partial conductive track are on the pedestal.

14. The electric work machine according to claim 11, wherein the conductive track includes a second partial conductive track on the insulator tubular body.

15. The electric work machine according to claim 14, wherein the second partial conductive track is printed on the insulator tubular body.

16. The electric work machine according to claim 11, wherein the first partial conductive track is printed on the insulator tooth.

* * * * *